(12) United States Patent
Shikina et al.

(10) Patent No.: US 10,542,231 B2
(45) Date of Patent: Jan. 21, 2020

(54) METHOD OF DRIVING IMAGE PICKUP DEVICE, IMAGE PICKUP DEVICE, IMAGE PICKUP SYSTEM

(71) Applicant: CANON KABUSHIKI KAISHA, Tokyo (JP)

(72) Inventors: Noriyuki Shikina, Hachioji (JP); Shintaro Takenaka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 90 days.

(21) Appl. No.: 15/360,829

(22) Filed: Nov. 23, 2016

(65) Prior Publication Data

US 2017/0155863 A1 Jun. 1, 2017

(30) Foreign Application Priority Data

Nov. 30, 2015 (JP) .................. 2015-234317

(51) Int. Cl.
| | |
|---|---|
| *H04N 5/378* | (2011.01) |
| *H04N 5/343* | (2011.01) |
| *H04N 5/347* | (2011.01) |
| *H04N 5/3745* | (2011.01) |
| *H04N 9/04* | (2006.01) |
| *H04N 5/376* | (2011.01) |

(52) U.S. Cl.
CPC .............. *H04N 5/378* (2013.01); *H04N 5/343* (2013.01); *H04N 5/347* (2013.01); *H04N 5/3765* (2013.01); *H04N 5/37457* (2013.01); *H04N 9/04* (2013.01)

(58) Field of Classification Search
CPC ........... H04N 5/335–347; H04N 5/369; H04N 5/374–378; H01L 27/14609; H01L 27/14612; H01L 27/14643; H01L 27/14645; H01L 27/14621; H01L 27/14627

See application file for complete search history.

(56) References Cited

U.S. PATENT DOCUMENTS

| | | | |
|---|---|---|---|
| 2005/0280727 A1 | 12/2005 | Sato et al. | |
| 2010/0128152 A1 | 5/2010 | Hayasaka | |
| 2010/0238330 A1 | 9/2010 | Hirota | |
| 2011/0176042 A1* | 7/2011 | Kato | ................. H01L 27/14609 348/294 |
| 2012/0298841 A1 | 11/2012 | Yamashita | |
| 2013/0087875 A1 | 4/2013 | Kobayashi | |
| 2013/0222662 A1 | 8/2013 | Sakurai et al. | |
| 2014/0267861 A1* | 9/2014 | Suh | ...................... H04N 5/3575 348/308 |
| 2015/0062391 A1 | 3/2015 | Murata | |

(Continued)

FOREIGN PATENT DOCUMENTS

| | | |
|---|---|---|
| JP | 2010-183195 A | 8/2010 |
| JP | 2015-177429 A | 10/2015 |

(Continued)

*Primary Examiner* — Paul M Berardesca

(74) *Attorney, Agent, or Firm* — CANON U.S.A., Inc. IP Division

(57) ABSTRACT

Periods in which first selection transistors of several pixel cells of a plurality of pixel cells are in an on state are overlapped, and periods in which second selection transistors of several other pixel cells of the plurality of pixel cells are in an on state are overlapped.

17 Claims, 14 Drawing Sheets

(56) References Cited

U.S. PATENT DOCUMENTS

| | | | |
|---|---|---|---|
| 2015/0304585 A1* | 10/2015 | Tanaka | H04N 5/378 |
| | | | 250/208.1 |
| 2017/0126993 A1* | 5/2017 | Madurawe | H04N 5/355 |
| 2017/0289480 A1* | 10/2017 | Ochiai | G06T 7/74 |

FOREIGN PATENT DOCUMENTS

| | | |
|---|---|---|
| JP | 2015-201778 A | 11/2015 |
| JP | 2017-059875 A | 3/2017 |

\* cited by examiner

METHOD OF DRIVING IMAGE PICKUP DEVICE, IMAGE PICKUP DEVICE, IMAGE PICKUP SYSTEM

BACKGROUND OF THE INVENTION

Field of the Invention

The aspect of the embodiments relates to a method of driving an image pickup device, an image pickup device, and an image pickup system.

Description of the Related Art

There is known an image pickup device in which pixels are arranged in a plurality of rows and a plurality of columns. An example of this image pickup device is an image pickup device disclosed in Japanese Patent Laid-Open No. 2010-183195.

Regarding the image pickup device disclosed in FIG. 22 of Japanese Patent Laid-Open No. 2010-183195, there is disclosed a pixel cell in which two photoelectric conversion units and two selection transistors are provided with respect to a single amplification transistor. Further, a plurality of signal lines are provided with respect to pixel cells in a single column. One and the other one of the two selection transistors included in the single pixel cell are connected to different signal lines.

SUMMARY OF THE INVENTION

An aspect of the present invention is a method of driving an image pickup device, the image pickup device including a plurality of pixel cells provided in a plurality of rows and a plurality of columns, each of the plurality of pixel cells including a plurality of photoelectric conversion units, a single amplification transistor connected to the plurality of photoelectric conversion units, and a first selection transistor and a second selection transistor connected to the single amplification transistor, the second selection transistor being different from the first selection transistor, and a first signal line and a second signal line different from the first signal line, the first signal line and the second signal line being provided corresponding to pixel cells in a single column, the first selection transistor being connected to the first signal line, and the second selection transistor being connected to the second signal line, wherein periods in which the first selection transistors of several pixel cells of the plurality of pixel cells are in an on state are overlapped, and periods in which the second selection transistors of several other pixel cells of the plurality of pixel cells are in an on state are overlapped. The method includes reading out a signal based on an electric charge of a first pixel cell to one of the first line and second line during a period overlapping a period in which an electric charge of a second pixel cell is read out to the other one of the first line and second line.

Further features of the aspect of the embodiments will become apparent from the following description of exemplary embodiments (with reference to the attached drawings).

DESCRIPTION OF THE EMBODIMENTS

Regarding the image pickup device disclosed in Japanese Patent Laid-Open No. 2010-183195, reading out signals from pixel cells to signal lines in a configuration in which a plurality of signal lines are provided with respect to pixel cells in a single column has not been satisfactorily studied. A technique described below relates to a technique that has been studied in terms of reading out signals from pixel cells to signal lines.

Hereinafter, examples will be described with reference to the drawings.

EXAMPLE 1

Figure 1:
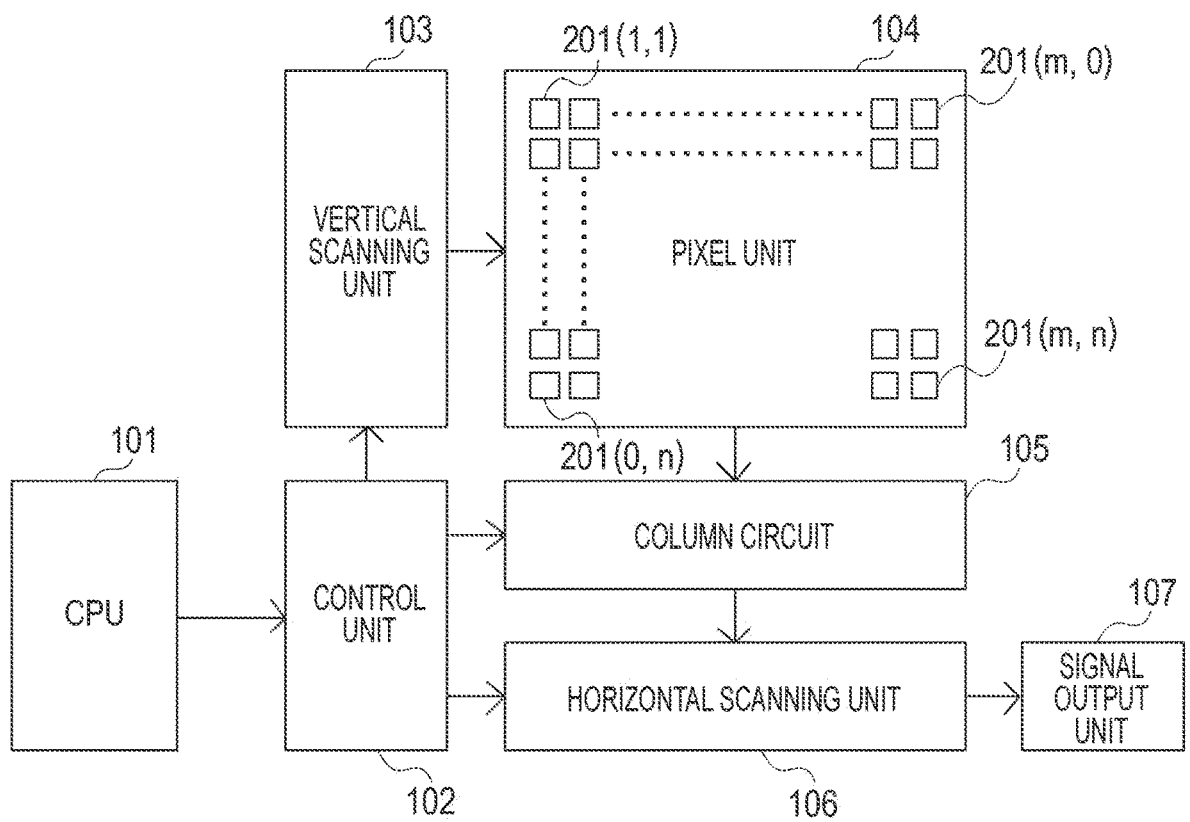
FIG. 1 illustrates a configuration of an image pickup device.

FIG. 1 illustrates a configuration of an image pickup device in this example. The image pickup device includes a CPU 101 for controlling the whole image pickup device and a control unit 102 that operates in response to a synchronization signal or communication from the CPU 101. The image pickup device further includes a vertical scanning unit 103 that operates in response to a control signal of the control unit 102 and a pixel unit 104 in which pixel cells 201 are arranged in a plurality of rows and a plurality of columns. Regarding the pixel cell 201, (m, n) written after the reference sign 201 indicates that the pixel cell 201 positions in the mth row and the nth column. Hereinafter, in this specification, an address of the pixel cell 201 is indicated by (m, n) as necessary. The image pickup device further includes a column circuit 105 for processing a signal from the pixel unit 104, a horizontal scanning unit 106, and a signal output unit 107. The column circuit 105 and the horizontal scanning unit 106 operate in response to control signals of the control unit 102. The column circuit 105 includes a plurality of column signal processing circuits.

Figure 2:
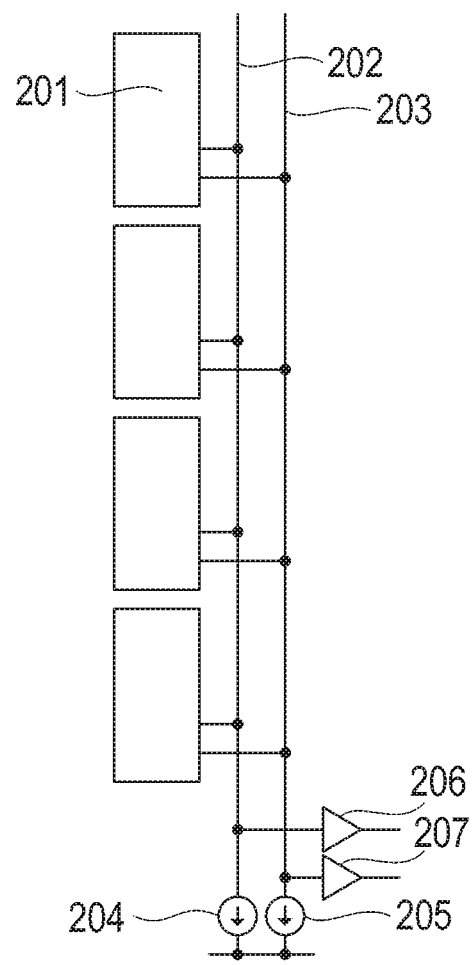
FIG. 2 illustrates a configuration related to pixel cells in a single column.

FIG. 2 illustrates a configuration related to the pixel cells 201 in a single column. A signal line 202 and a signal line 203, which are a plurality of signal lines, are provided corresponding to the pixel cells 201 in a single column. A single pixel cell 201 is connected to the signal line 202 and the signal line 203. The signal line 202 is connected to a current source 204 and an amplification unit 206. The signal line 203 is connected to a current source 205 and an amplification unit 207. A single column signal processing circuit includes one of the amplification unit 206 and the amplification unit 207. In other words, the signal line 202 and the signal line 203 are connected to different column signal processing circuits.

Figure 3:
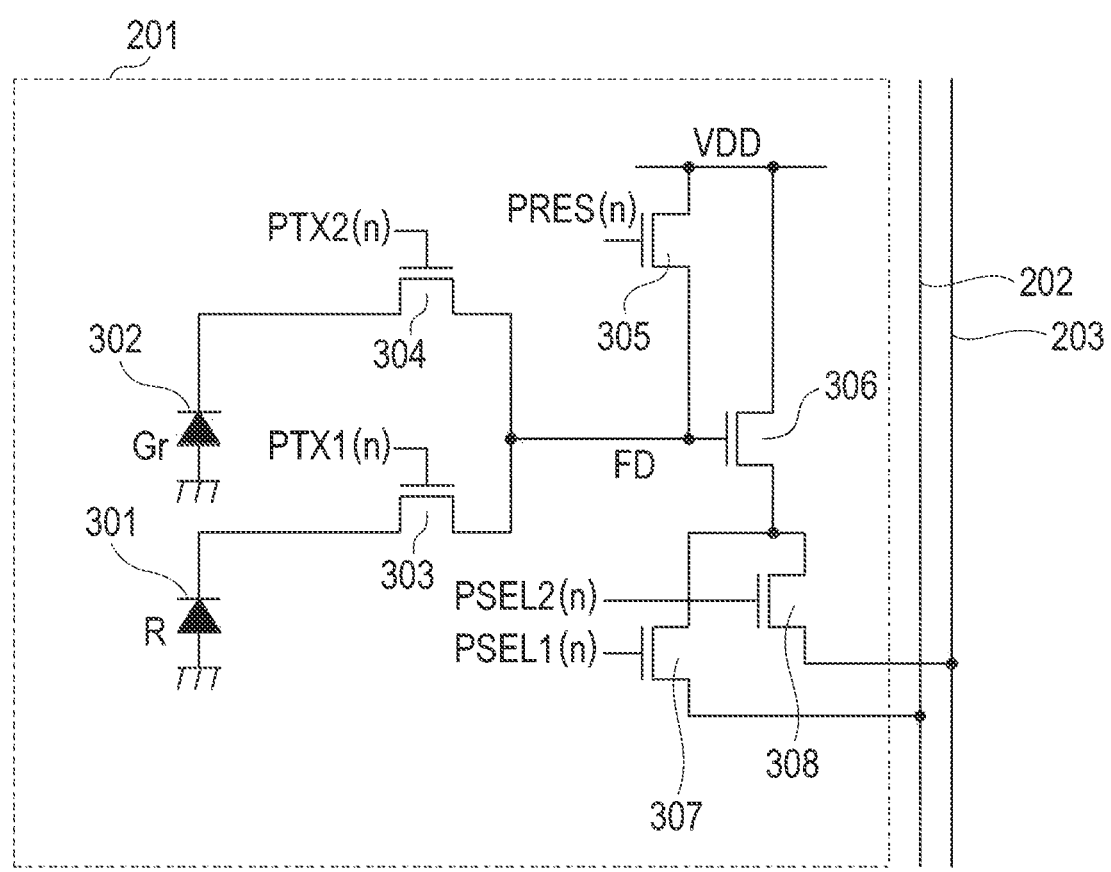
FIG. 3 illustrates a configuration of a pixel cell.

FIG. 3 illustrates a configuration of the pixel cell 201. The pixel cell 201 includes a photodiode 301 and a photodiode 302 as a plurality of photoelectric conversion units. Light that has been transmitted through a color filter of red (represented by R in FIG. 3) is incident on the photodiode 301. Light that has been transmitted through a color filter of green (represented by Gr in FIG. 3) is incident on the photodiode 302. The color filter of red is a first color filter that allows light of first color to be incident on the photoelectric conversion unit. The color filter of green is a second color filter that allows light of second color to be incident on the photoelectric conversion unit. The pixel cell 201 includes a transfer transistor 303, a transfer transistor 304, and an amplification transistor 306. The transfer transistor 303 is connected to the photodiode 301 and an input node FD of the amplification transistor 306. The transfer transistor 304 is connected to the photodiode 302 and the input node FD of the amplification transistor 306. The pixel cell 201 also includes a reset transistor 305. A power source voltage VDD is supplied to the reset transistor 305 and the input node FD is connected thereto. The pixel cell 201 includes a selection transistor 307 and a selection transistor 308. The selection transistor 307 and the selection transistor 308 are connected to the single amplification transistor 306. The selection transistor 307 is connected to the signal line 202. The selection transistor 308 is connected to the signal line 203. The vertical scanning unit 103, which has been described with reference to FIG. 1, supplies a signal PTX1(n) to a gate of the transfer transistor 303 and supplies a signal PTX2(n) to a gate of the transfer transistor 304. Note that (n) used for representing this signal means that the signal is supplied to the pixel cell 201 in the nth row. When the signal PTX1(n) is high, the transfer transistor 303 transfers an electric charge accumulated by the photodiode 301 to the input node FD. When the signal PTX2(n) is high, the transfer transistor 304 transfers an electric charge accumulated by the photodiode 302 to the input node FD.

The vertical scanning unit 103 supplies a signal PRES(n) to a gate of the reset transistor 305. When the signal PRES(n) is high, the reset transistor 305 resets the input node FD to an electric potential based on an electric potential of the power source voltage VDD.

The vertical scanning unit 103 supplies a signal PSEL1(n) to a gate of the selection transistor 307 and supplies a signal PSEL2(n) to a gate of the selection transistor 308. When the signal PSEL1(n) is high, an electric current is supplied from the current source 204 illustrated in FIG. 2 to the amplification transistor 306 via the signal line 202 and the selection transistor 307. With this supply of the electric current, the amplification transistor 306 performs source follower operation of outputting a signal based on an electric potential of the input node FD to the signal line 202 via the selection transistor 307. The power source voltage VDD, the amplification transistor 306, and the current source 204 form a source follower circuit. Meanwhile, when the signal PSEL2(n) is high, an electric current is supplied from the current source 205 illustrated in FIG. 2 to the amplification transistor 306 via the signal line 203 and the selection transistor 308. With this supply of the electric current, the amplification transistor 306 performs source follower operation of outputting a signal based on an electric potential of the input node FD to the signal line 203 via the selection transistor 308. The power source voltage VDD, the amplification transistor 306, and the current source 205 form a source follower circuit.

Figure 4:
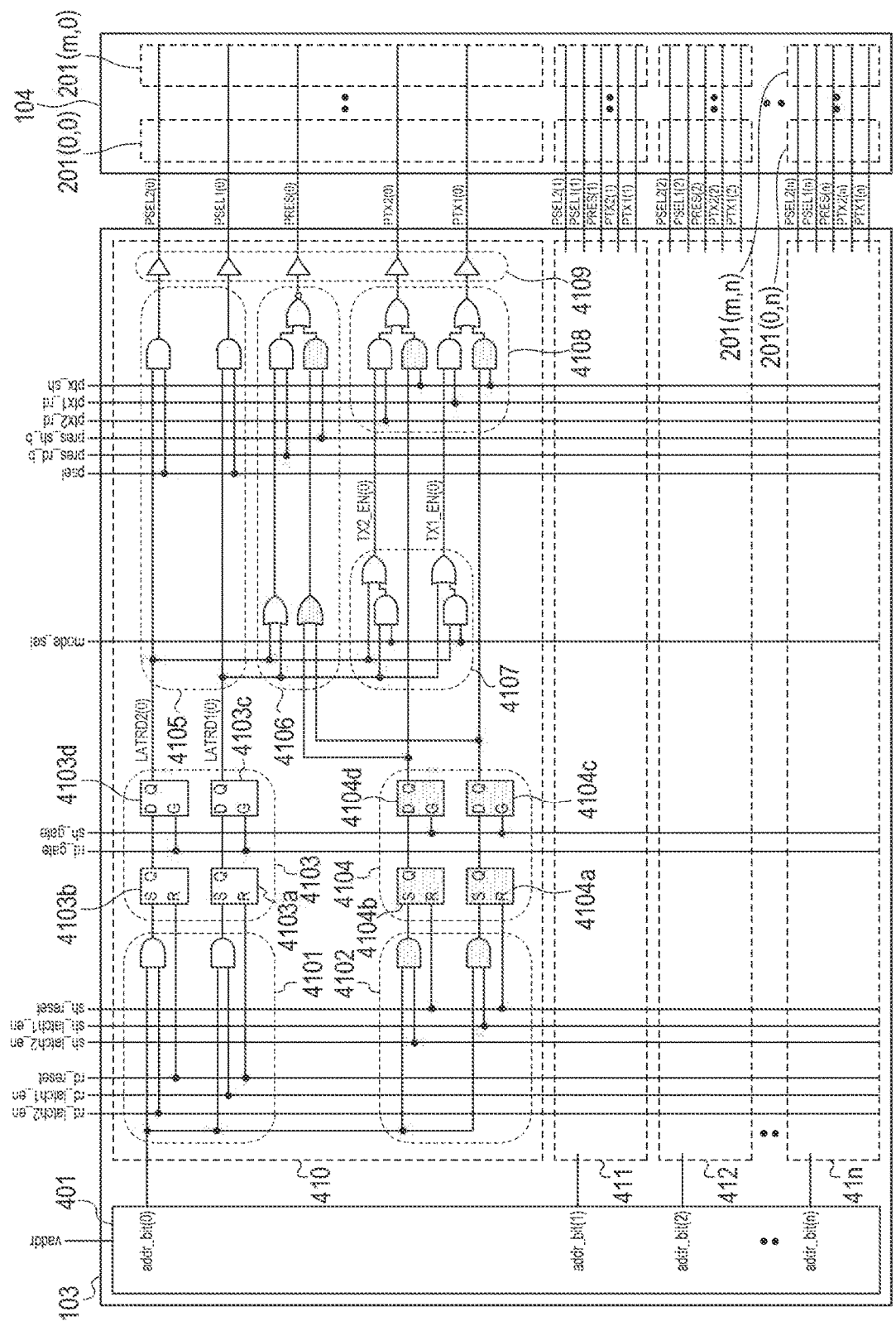
FIG. 4 illustrates a configuration of a vertical scanning unit.

FIG. 4 illustrates a configuration of the vertical scanning unit 103. The vertical scanning unit 103 includes an address decoder unit 401 and row driving units 410 to 41n. The address decoder unit 401 decodes an address signal vaddr generated in the control unit 102 into addr_bit(0) to (n). The row driving unit 410 includes a read-out scanning setting unit 4101 and a shutter scanning setting unit 4102.

The row driving unit 410 includes a read-out scanning decode bit holding unit 4103 and a shutter scanning decode bit holding unit 4104.

The row driving unit 410 includes a PSEL generation unit 4105, a PRES generation unit 4106, a PTX enable generation unit 4107, a PTX generation unit 4108, and a level shift unit 4109. The level shift unit 4109 is a circuit for shifting a level of an input signal to an electric potential at a level suitable to be used as a control signal for a transistor.

The read-out scanning setting unit 4101 resets read-out scanning decode bit holding units 4103a and 4103b by using a signal rd_reset generated in the control unit 102. Further, the read-out scanning setting unit 4101 sets the read-out scanning decode bit holding unit 4103a by using a logical conjunction of a signal rd_latch1_en generated in the control unit 102 and addr_bit(0).

The read-out scanning setting unit 4101 sets the read-out scanning decode bit holding unit 4103b by using a logical conjunction of a signal rd_latch2_en generated in the control unit 102 and addr_bit(0).

A signal rd_reset is a signal common to the row driving units 410 to 41n and can simultaneously reset the decode bit holding unit 4103 and the decode bit holding unit 4104 in each row driving unit. Address signals vaddr are sequentially generated in the control unit 102, and the address decoder unit 401 sequentially decodes the address signals to addr_bit. In the row driving units 410 to 41n, levels of rd_latch1_en and rd_latch2_en which are common signals are caused to transition from low→high and high→low in synchronization with transition of addr_bit. In this way, the row driving units 410 to 41n can sequentially set the decode bit holding units 4103 and 4104.

The shutter scanning setting unit 4102 has a configuration similar to that of the read-out scanning setting unit 4101. As signals, sh_reset, sh_latch1_en, and sh_latch2_en are used.

The read-out scanning decode bit holding unit 4103 includes 4103a to 4103d. 4103a and 4103b are primary holding circuits and are, for example, SR-Latch. 4103c and 4103d are secondary holding circuits for synchronization and are, for example, D-Latch and can synchronize (simultaneously set) decode bits held in the primary holding circuits in each row by using a signal rd_gate generated in the control unit 102.

The shutter scanning decode bit holding unit 4104 has a configuration similar to that of the read-out scanning decode bit holding unit 4103. The shutter scanning decode bit holding unit 4104 includes 4104a to 4104d. As a signal, sh_gate is used.

The PSEL generation unit 4105 is configured by a combinational logic circuit of signals LATRD1(0) and LATRD2(0) of the decode bit holding unit 4103 and a signal psel generated in the control unit 102.

A signal before level shift of a driving signal PSEL1(0) in a pixel is generated by a logical conjunction of a signal LATRD1 of the secondary holding circuit 4103c of the decode bit holding unit 4103 and a signal psel. A signal before level shift of a driving signal PSEL2(0) in a pixel is generated by a logical conjunction of a signal LATRD2 of the secondary holding circuit 4103d of the decode bit holding unit 4103 and a signal psel.

The PRES generation unit 4106 is configured by a combinational logic circuit of signals of the decode bit holding units 4103 and 4104 and signals pres_rd_b and pres_sh_b generated in the control unit 102. A signal PRES(n) is generated by this combinational logic circuit.

The PTX enable generation unit 4107 is configured by a combinational logic circuit of signals LATRD1 and LATRD2 of the decode bit holding unit 4103 and a mode select signal mode_sel generated in the control unit 102. In the case where mode_sel is high, TX1_EN and TX2_EN become high when any one of LATRD1 and LATRD2 becomes high. In the case where mode_sel is low, TX1_EN becomes high when LATRD1 becomes high, whereas TX2_EN becomes high when LATRD2 becomes high.

The PTX generation unit 4108 is configured by a logic circuit in which signals TX1_EN and TX2_EN of the PTX enable generation unit 4107, a signal of the decode bit holding unit 4104, and signals ptx1_rd, ptx2_rd, and ptx_sh of the control unit 102 are combined.

Figure 5:
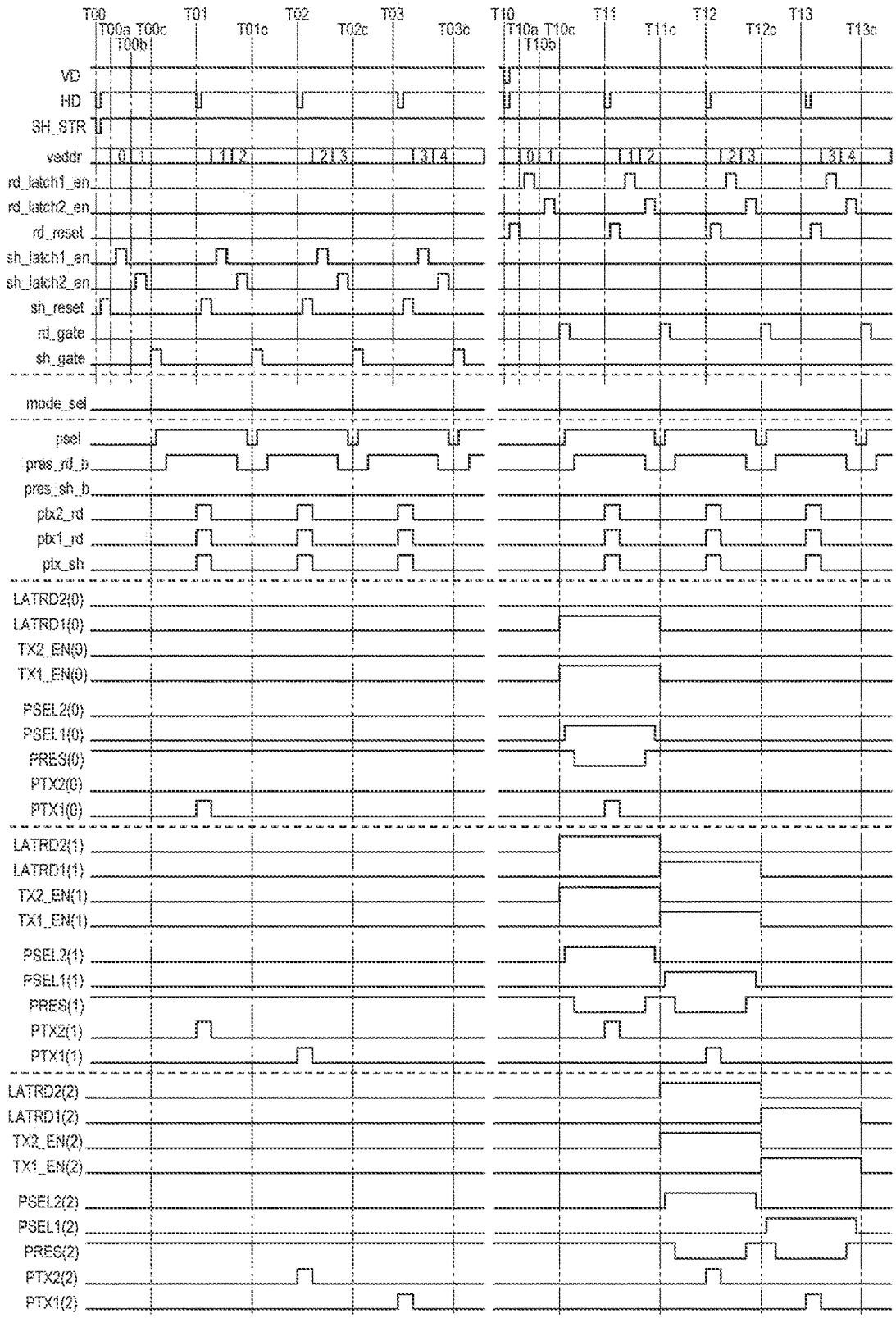
FIG. 5 illustrates operation of an image pickup device.

FIG. 5 is a timing chart illustrating an example of operation of the vertical scanning unit 103 and the pixel unit 104 illustrated in FIG. 4. Note that, in this driving method, a period in which a signal based on an electric charge of the photodiode 301 of R in the pixel cell 201 (x, y) is read out to one of the signal line 202 and the signal line 203 is overlapped with a period in which a signal based on an electric charge of the photodiode 302 of Gr in the pixel cell 201 (x, y+1) is read out to the other one of the signal line 202 and the signal line 203. Hereinafter, this method is referred to as "different color parallel read-out".

In this driving method, output of a mode select signal mode_sel is low.

Reset operation of the photodiodes 301 and 302 will be described. Herein, description will be made by using a rolling shutter method (a time period from an electric reset timing of the photodiodes 301 and 302 to a read-out timing thereof is an exposure time period) as an example. In this example, an interval between a shutter start signal SH_STR and a vertical synchronization signal VD corresponds to an exposure time period.

The reset operation of the photodiodes 301 and 302 is started at a time T00. The CPU 101 inputs a shutter start signal SH_STR and a horizontal synchronization signal HD to the control unit 102.

Then, from the time T00 to a time T00a, the primary holding circuits 4104a and 4104b of the shutter scanning decode bit holding units 4104 are reset all together. The control unit 102 causes a signal sh_reset to transition from low→high→low to reset the primary holding circuits 4104a and 4104b in all rows.

Then, from the time T00a to a time T00b, the primary holding circuits 4104a of the shutter scanning decode bit holding units 4104 are set. The control unit 102 sets vaddr to 0, and addr_bit(0) of the address decoder unit 401 outputs high. The other signals addr_bit(1) to addr_bit(n) output low. At this time, a signal sh_latch1_en is caused to transition from low→high→low, and high is set in the primary holding circuit 4104a in the 0th row. Meanwhile, low is set in the primary holding circuits 4104a in the other rows.

Then, from the time T00b to a time T00c, the primary holding circuits 4104b of the shutter scanning decode bit holding units 4104 are set. The control unit 102 sets vaddr to 1, and addr_bit(1) of the address decoder unit 401 outputs high. The other signals addr_bit(y) output low. At this time, a signal sh_latch2_en is caused to transition from low→high→low, and high is set in the primary holding circuit 4104b in the 1st row. Meanwhile, low is set in the primary holding circuits 4104b in the other rows.

Then, from the time T00c to a time T01c, the secondary holding circuits 4104c and 4104d of the shutter scanning decode bit holding units 4104 perform holding operation. The control unit 102 causes a signal sh_gate to transition from low→high→low. Then, in the vertical scanning unit 103, the secondary holding circuits 4104c of all the shutter scanning decode bit holding units obtain output of Q of the primary holding circuits 4104a. Similarly, the secondary holding circuits 4104d of all the shutter scanning decode bit holding units obtain output of Q of the primary holding circuits 4104b. Therefore, in this period, Q of the secondary holding circuit 4104c in the 0th row continuously outputs high, and Q of the secondary holding circuits 4104c in the other rows continuously outputs low. Further, in this period, Q of the secondary holding circuit 4104d in the 1st row continuously outputs high, and Q of the secondary holding circuits 4104d in the other rows continuously outputs low.

A pixel driving signal in a similar period of time, i.e., from the time T00c to the time T01c will be described.

PRES(0) and PRES(1) transition in accordance with an inverted waveform of a signal pres_sh_b. Because PRES(0) and PRES(1) are high, the input nodes FD of the pixel cells 201 (0, 0) to (m, 0) and the pixel cells 201 (0, 1) to (m, 1) are in a reset state (electric potential based on power source voltage VDD). In this example, regardless of presence/absence of row selection, the input nodes FD are in a reset state except at a read-out time.

PTX1(0) and PTX2(1) transition in accordance with a waveform of a signal ptx_sh. At this time, PTX1(0) transitions from low→high→low, and the photodiodes 301 (photodiodes 301 of R) in the pixel cells 201 (0, 0) to (m, 0) are reset. Similarly, PTX2(1) transitions from low→high→low, and the photodiodes 302 (photodiodes 302 of Gr) in the pixel cells 201 (0, 1) to (m, 1) are reset.

Thereafter, from the time T01c to a time T02c, a row to be selected is changed and operation similar to the above operation is performed. The photodiodes 301 (photodiodes 301 of R) in the pixel cells 201 (0, 1) to (m, 1) are reset. The photodiodes 302 (photodiodes 302 of Gr) in the pixel cells 201 (0, 2) to (m, 2) are reset.

Thereafter, similarly, the photodiodes 301 (photodiodes 301 of R) and the photodiodes 302 (photodiodes 302 of Gr) are reset while a row to be selected is being changed. Finally, the photodiodes 301 (photodiodes 301 of R) in the pixel cells 201 (0, n−1) to (m, n−1) are reset. Further, the photodiodes 302 (photodiodes 302 of Gr) in the pixel cells 201 (0, n) to (m, n) are reset.

Next, read-out operation of signals based on electric charges accumulated in the photodiodes 301 and 302 will be described.

The read-out operation of signals based on electric charges accumulated in the photodiodes 301 and 302 is started at a time T10. The CPU 101 inputs a vertical synchronization signal VD and a horizontal synchronization signal HD to the control unit 102.

Then, from the time T10 to a time T10a, the primary holding circuits 4103a and 4103b of the read-out scanning decode bit holding units 4103 are reset all together. The control unit 102 causes a signal rd_reset to transition from low→high→low to reset the primary holding circuits 4103a and 4103b in all rows.

Then, from the time T10a to a time T10b, the primary holding circuits 4103a of the read-out scanning decode bit holding units 4103 are set. The control unit 102 sets vaddr to 0, and addr_bit(0) of the address decoder unit 401 outputs high. The other signals addr_bit(1) to addr_bit(n) output low. At this time, a signal rd_latch1_en is caused to transition from low→high→low, and high is set in the primary holding circuit 4103a in the 0th row. Meanwhile, low is set in the primary holding circuits 4103a in the other rows.

Then, from the time T10b to a time T10c, the primary holding circuits 4103b of the read-out scanning decode bit holding units 4103 are set. The control unit 102 sets vaddr to 1, and addr_bit(1) of the address decoder unit 401 outputs high. The other signals addr_bit(y) output low. At this time, a signal rd_latch2_en is caused to transition from low→high→low, and high is set in the primary holding circuit 4103b in the 1st row. Meanwhile, low is set in the primary holding circuits 4103b in the other rows.

Then, from the time T10c to a time T11c, the secondary holding circuits 4103c and 4103d of the read-out scanning decode bit holding units 4103 perform holding operation of signals. The control unit 102 causes a signal rd_gate to transition from low→high→low. Then, in the vertical scanning unit 103, the secondary holding circuits 4103c of all the read-out scanning decode bit holding units obtain output of Q of the primary holding circuits 4103a. Similarly, the secondary holding circuits 4103d of all the read-out scanning decode bit holding units obtain output of Q of the primary holding circuits 4103b. Therefore, in this period, Q (LATRD1(0)) of the secondary holding circuit 4103c in the 0th row continuously outputs high, and Q of the secondary holding circuits 4103c in the other rows continuously outputs low. Further, in this period, Q (LATRD2(1)) of the secondary holding circuit 4104d in the 1st row continuously outputs high, and Q of the secondary holding circuits 4104d in the other rows continuously outputs low.

Operation of the PTX enable generation unit 4107 in a similar period of time, i.e., from the time T10c to the time T11c will be described. In the 0th row, mode_sel is low and LATRD1(0) is high, and therefore TX1_EN(0) becomes high. Further, mode_sel is low and LATRD2(0) is low, and therefore TX2_EN(0) becomes low. In the 1st row, mode_sel is low and LATRD1(1) is low, and therefore TX1_EN(1) becomes low. Further, mode_sel is low and LATRD2(1) is high, and therefore TX2_EN(1) is high. In all the other rows, both TX1_EN(y) and TX2_EN(y) are low.

A pixel driving signal in the similar period of time, i.e., from the time T10c to the time T11c will be described.

Regarding PSEL1(y), only PSEL1(0) transitions in accordance with a waveform of a signal psel because LATRD1(0) is high. Therefore, in the pixel cells 201 (0, 0) to (m, 0), the selection transistors 307 are turned on to be connected to the signal lines 202. The other rows are not connected to the signal lines 202.

Regarding PSEL2(y), only PSEL2(1) transitions in accordance with a waveform of a signal psel because LATRD2(1) is high. Therefore, in the pixel cells 201 (0, 1) to (m, 1), the selection transistors 308 are turned on to be connected to the signal lines 203. The other rows are not connected to the signal lines 203.

Regarding PRES(y), PRES(0) and PRES(1) transition in accordance with an inverted waveform of a signal pres_rd_b because LATRD1(0) and LATRD2(1) are high. Therefore, in the pixel cells 201 (0, 0) to (m, 0) and the pixel cells 201 (0, 1) to (m, 1), reset of the input nodes FD is canceled in a period in which pres_rd_b is high. In the other rows, the input nodes FD are held in a reset state.

Regarding PTX1(y), only PTX1(0) transitions in accordance with a waveform of a signal ptx1_rd because TX1_EN(0) is high. Therefore, the photodiodes 301 (photodiodes 301 of R) in the pixel cells 201 (0, 0) to (m, 0) can be read out via the signal lines 202.

Regarding PTX2(y), only PTX2(1) transitions in accordance with a waveform of a signal ptx2_rd because TX2_EN(1) is high. Therefore, the photodiodes 302 (photodiodes 302 of Gr) in the pixel cells 201 (0, 1) to (m, 1) can be read out via the signal lines 203.

Thereafter, from the time T11c to a time T12c, a row to be selected is changed and operation similar to the above operation is performed. The photodiodes 301 (photodiodes 301 of R) in the pixel cells 201 (0, 1) to (m, 1) are read out. Further, the photodiodes 302 (photodiodes 302 of Gr) in the pixel cells 201 (0, 2) to (m, 2) are read out.

Thereafter, similarly, signals based on electric charges of the photodiodes 301 (photodiodes 301 of R) and the photodiodes 302 (photodiodes 302 of Gr) are read out while a row to be selected is being changed. Finally, signals based on electric charges of the photodiodes 301 (photodiodes 301 of R) in the pixel cells 201 (0, n−1) to (m, n−1) are read out. Further, signals based on electric charges of the photodiodes 302 (photodiodes 302 of Gr) in the pixel cells 201 (0, n) to (m, n) are read out.

In the case of this driving method (different color parallel read-out), row selection timings of PSEL1(y) and PTX1(y) are the same, and row selection timings of PSEL2(y) and PTX2(y) are the same. By using this, the read-out scanning decode bit holding unit 4103 is used in common for PSEL and PTX, and thus a scanning circuit is simplified.

In the different color parallel read-out, it is possible to read out signals based on electric charges of the photodiodes 301 and 302 to the signal lines 202 and 203 in accordance with a physical array of color filters. With this, in the following system for generating an image with the use of signals output by the image pickup device, processing of rearranging the signals can be omitted. With this, it is possible to reduce a load of the following system.

Note that, in this example, a period in which a signal based on an electric charge of the photodiode 301 of R in the pixel cell 201 (x, y) is read out to one of the signal line 202 and the signal line 203 is overlapped with a period in which a signal based on an electric charge of the photodiode 302 of Gr in the pixel cell 201 (x, y+1) is read out to the other one of the signal line 202 and the signal line 203. Regarding this overlap of the periods, the periods from the start of reading out the signals to the end thereof do not need to be completely overlapped. In other words, it overlaps at least a part of the period in which a signal based on an electric charge of the photodiode 301 of R in the pixel cell 201 (x, y) is read out to one of the signal line 202 and the signal line 203 with at least a part of the period in which a signal based on an electric charge of the photodiode 302 of Gr in the pixel cell 201 (x, y+1) is read out to the other one of the signal line 202 and the signal line 203. However, when the whole periods from the start of reading out signals to the end thereof are completely overlapped, it is possible to read out the signals at a higher speed.

EXAMPLE 2

Regarding an image pickup device in this example, a difference between this example and Example 1 will be mainly described.

A configuration of the image pickup device in this example is the same as the configuration described in Example 1.

Figure 6:
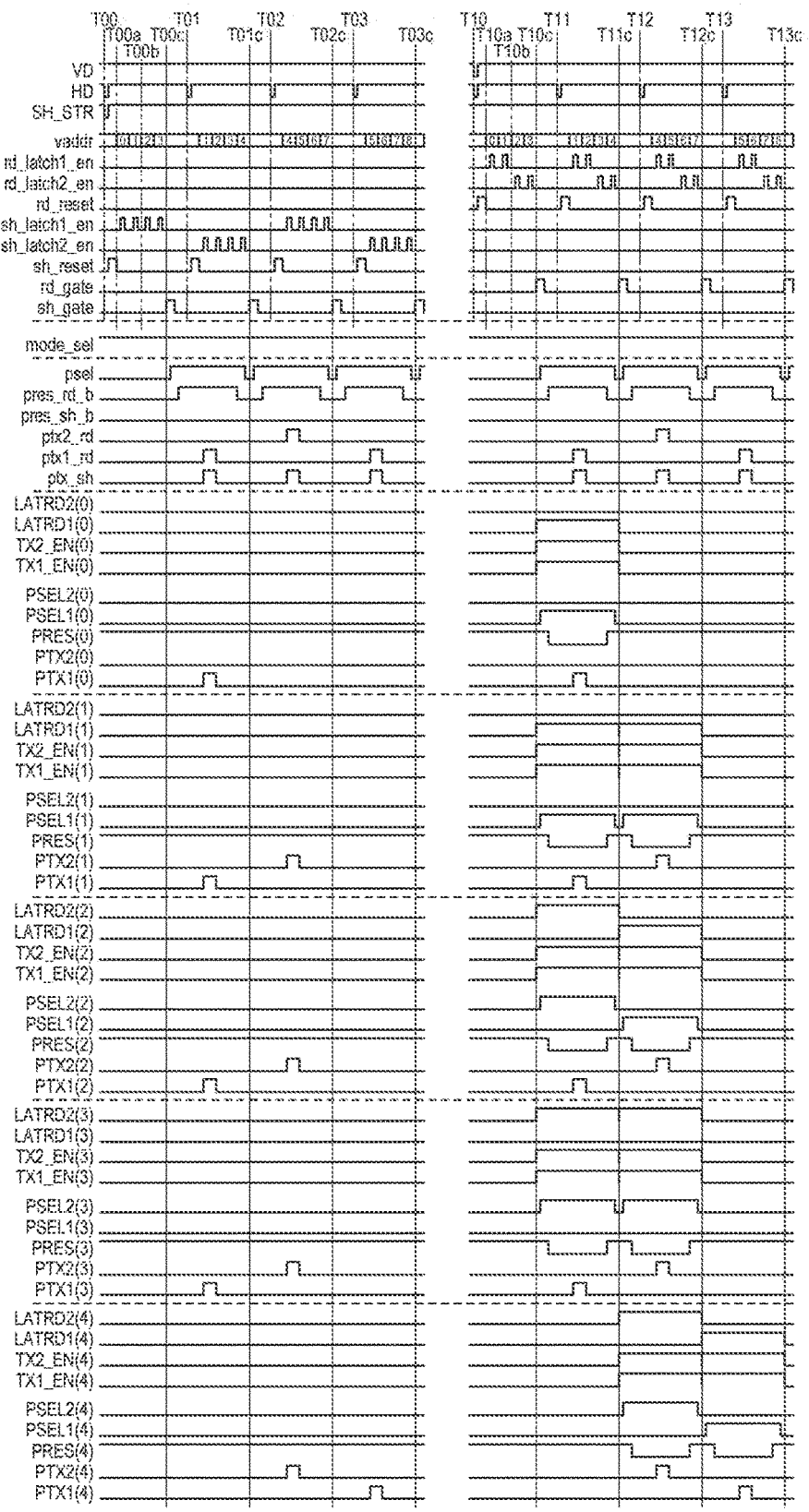
FIG. 6 illustrates operation of an image pickup device.

FIG. 6 is a timing chart illustrating an example of operation of the vertical scanning unit 103 and the pixel unit 104 illustrated in FIG. 4. Note that, in a driving method described herein, signals based on electric charges of the photodiodes 301 of R in the pixel cell 201 (x, y), the pixel cell 201 (x, y+1), the pixel cell 201 (x, y+2), and the pixel cell 201 (x, y+3) are read out in parallel. Hereinafter, this method is referred to as "same color column read-out". A period in which the selection transistor 307 of the pixel cell 201 (x, y) is in an on state is overlapped with a period in which the selection transistor 307 of the pixel cell 201 (x, y+1) is in an on state. With this, signals output from the pixel cell 201 (x, y) and the pixel cell 201 (x, y+1) are mixed in the signal line 202. Similarly, a period in which the selection transistor 308 of the pixel cell 201 (x, y+2) is in an on state is overlapped with a period in which the selection transistor 308 of the pixel cell 201 (x, y+3) is in an on state. With this, signals output from the pixel cell (x, y+2) and the pixel cell 201 (x, y+3) are mixed in the signal line 203. The number of pixel cells that are simultaneously read out are large, as compared with a driving method "different color parallel read-out". Therefore, read-out can be performed at a high speed. For this reason, the same color column read-out is performed in this driving method. Further, an input node of the amplification transistor 306 in each pixel cell 201 is not connected to input nodes of other amplification transistors 306. With this, the amplification transistor of each pixel cell 201 outputs a signal based on an electric charge generated by the photodiode of the corresponding pixel cell 201.

In this driving method, output of a mode select signal mode_sel is high.

Reset operation of photodiodes will be described. Herein, as well as in the driving method "different color parallel read-out", description will be made by using a rolling shutter method as an example. An interval between a shutter start signal SH_STR and a vertical synchronization signal VD corresponds to an exposure time period.

The reset operation of the photodiodes is started at a time T00. The CPU 101 inputs a shutter start signal SH_STR and a horizontal synchronization signal HD to the control unit 102.

Then, from the time T00 to a time T00a, the primary holding circuits 4104a and 4104b of the shutter scanning decode bit holding unit 4104 are reset all together. The control unit 102 causes a signal sh_reset to transition from low→high→low to reset the primary holding circuits 4104a and 4104b in all rows.

Then, from the time T00a to a time T00b, the primary holding circuits 4104a of the shutter scanning decode bit holding units 4104 for two rows are set. First, the control unit 102 sets vaddr to 0, and addr_bit(0) of the address decoder unit 401 outputs high. At this time, the other signals addr_bit(1) to addr_bit(n) output low. Herein, a signal sh_latch1_en is caused to transition from low→high→low to set high in the primary holding circuit 4104a in the 0th row. Thereafter, similarly, the control unit 102 sets vaddr to 1, and a signal sh_latch1 _en is caused to transition from low→high→low to set high in the primary holding circuit 4104a in the 1st row.

Then, the primary holding circuits 4104a of the shutter scanning decode bit holding unit 4104 are set also from the time T00b to a time T00c as well as in the previous period of time. The control unit 102 sets vaddr to 2, and a signal sh_latch1_en is caused to transition from low→high→low to set high in the primary holding circuit 4104a in the 2nd row. Thereafter, similarly, the control unit 102 sets vaddr to 3, and a signal sh_latch1_en is caused to transition from low→high→low to set high in the primary holding circuit 4104a in the 3rd row.

Then, from the time T00c to a time T01c, the secondary holding circuits 4104c and 4104d of the shutter scanning decode bit holding unit 4104 perform holding operation. The control unit 102 causes a signal sh_gate to transition from low→high→low. Then, in the vertical scanning unit 103, the secondary holding circuits 4104c of all the shutter scanning decode bit holding units obtain output of Q of the primary holding circuits 4104a. Similarly, the secondary holding circuits 4104d of all the shutter scanning decode bit holding units obtain output of Q of the primary holding circuits 4104b. Therefore, in this period, Q of the secondary holding circuits 4104c in the 0th row, the 1st row, the 2nd row, and the 3rd row continuously outputs high, and Q of the secondary holding circuits 4104c in the other rows continuously outputs low. Further, in this period, Q of the secondary holding circuits 4104d in all rows continuously outputs low.

A pixel driving signal in a similar period of time, i.e., from the time T00c to the time T01c will be described.

PRES(y00) (hereinafter, y00 is 0 to 3) transitions in accordance with an inverted waveform of a signal pres_sh_b. Because PRES(y00) is high, the input nodes FD of the pixel cells 201 (0, y00) to (m, y00) are in a reset state (electric potential based on power source voltage VDD). In this example, regardless of presence/absence of row selection, the input nodes FD are in a reset state except at a read-out time.

PTX1(y00) transitions in accordance with a waveform of a signal ptx_sh. At this time, PTX1(y00) transitions from low→high→low, and the photodiodes 301 (R) in the pixel cells 201 (0, y00) to (m, y00) are reset.

PTX2(y) is held to be low in all the rows in this period of time. Therefore, the photodiodes 302 (Gr) are not reset.

Thereafter, from the time T01c to the time T02c, a row to be selected is changed and operation similar to the above operation is performed. The photodiodes 302 (Gr) in the pixel cells 201 (0, y01) to (m, y01) (y01 is 1 to 4) are reset.

Thereafter, similarly, a row to be selected is shifted while reset of the photodiodes 301 (R) and reset of the photodiodes 302 (Gr) are being switched in the unit of horizontal synchronization signal HD.

Next, read-out operation of signals based on electric charges of the photodiodes 301 and 302 will be described.

The read-out operation of signals based on electric charges of the photodiodes 301 and 302 is started at a time T10. The CPU 101 inputs a vertical synchronization signal VD and a horizontal synchronization signal HD to the control unit 102.

Then, from the time T10 to a time T10a, the primary holding circuit 4103a and 4103b of the read-out scanning decode bit holding units 4103 are reset all together. The control unit 102 causes a signal rd_reset to transition from low→high→low to reset the primary holding circuits 4103a and 4103b in all rows.

Then, from the time T10a to a time T10b, the primary holding circuits 4103a of the read-out scanning decode bit holding units 4103 for two rows are set. The control unit 102 sets vaddr to 0, and addr_bit(0) of the address decoder unit 401 outputs high. At this time, a signal rd_latch1_en is caused to transition from low→high→low to set high in the primary holding circuit 4103a in the 0th row. Thereafter, similarly, the control unit 102 sets vaddr to 1 and causes a signal rd_latch1_en to transition from low→high→low to set high in the primary holding circuit 4103a in the 1st row.

Then, from the time T10b to a time T10c, the primary holding circuits 4103b of the read-out scanning decode bit holding units 4103 for two rows are set. The control unit 102 sets vaddr to 2 and causes a signal rd_latch2_en to transition from low→high→low to set high in the primary holding circuit 4103b in the 2nd row. Thereafter, similarly, the control unit 102 sets vaddr to 3 and causes a signal rd_latch2_en to transition from low→high→low to set high in the primary holding circuit 4103b in the 3rd row.

Then, from the time T10c to a time T11c, the secondary holding circuits 4103c and 4103d of the read-out scanning decode bit holding units 4103 perform holding operation. The control unit 102 causes a signal rd_gate to transition from low→high→low. Then, in the vertical scanning unit 103, the secondary holding circuits 4103c of all the read-out scanning decode bit holding units obtain output of Q of the primary holding circuits 4103a. Similarly, the secondary holding circuits 4103d of all the read-out scanning decode bit holding units obtain output of Q of the primary holding circuits 4103b. Therefore, in this period, Q (LATRD1(0), LATRD1(1)) of the secondary holding circuits 4103c in the 0th row and the 1st row continuously outputs high, and Q of the secondary holding circuits 4103c in the other rows continuously outputs low. Further, in this period, Q (LATRD2(2), LATRD2(3)) of the secondary holding circuits 4104d in the 2nd row and the 3rd row continuously outputs high, and Q of the secondary holding circuits 4104d in the other rows continuously outputs low.

Operation of the PTX enable generation unit 4107 in a similar period of time, i.e., from the time T10c to the time T11c will be described. In the 0th row and the 1st row, mode_sel is high and LATRD1(0) and LATRD1(1) are high, and therefore TX1_EN(0) and TX1_EN(1) become high and TX2_EN(0) and TX2_EN(1) also become high. In the 2nd row and the 3rd row, mode_sel is high and LATRD2(2) and LATRD2(3) are high, and therefore TX2_EN(2) and TX2_EN(3) become high and TX1_EN(2) and TX1_EN(3) also become high. In all the other rows, both TX1_EN(y) and TX2_EN(y) are low.

A pixel driving signal in the similar period of time, i.e., from the time T00c to the time T01c will be described.

PSEL1(y10_1) (hereinafter, y10_1 is 0 to 1) transitions in accordance with a waveform of a signal psel because LATRD1(y10_1) is high. Therefore, in the pixel cells 201 (0, y10_1) to (m, y10_1), the selection transistors 307 are turned on to be connected to the signal lines 202. The other rows are not connected to the signal lines 202.

PSEL2(y10_2) (hereinafter, y10_2 is 2 to 3) transitions in accordance with a waveform of a signal psel because LATRD2(y10_2) is high. Therefore, in the pixel cells 201 (0, y10_2) to (m, y10_2), the selection transistors 308 are turned on to be connected to the signal lines 203. The other rows are not connected to the signal lines 203.

PRES(y10_1) and PRES(y10_2) transition in accordance with an inverted waveform of a signal pres_rd_b because any one of LATRD1 and LATRD2 in the row is high. Therefore, in the pixel cells 201 (0, y10_1) to (m, y10_1) and the pixel cells 201 (0, y10_2) to (m, y10_2), reset of the input nodes FD is canceled in a period in which pres_rd_b is high. In the other rows, the input nodes FD are held in a reset state.

PTX1(y10_1) transitions in accordance with a waveform of a signal ptx1_rd because TX1_EN(y10_1) is high. Therefore, the photodiodes 301 (R) in the pixel cells 201 (0, y10_1) to (m, y10_1) can be read out via the signal lines 202. Therefore, it is possible to mix signals based on electric charges of the photodiodes 301 (R) in the pixel cell 201 (x, 0) and the pixel cell 201 (x, 1).

PTX1(y10_2) transitions in accordance with a waveform of a signal ptx1_rd because TX1_EN(y10_2) is high. Therefore, the photodiodes 301 (R) in the pixel cells 201 (0, y10_2) to (m, y10_2) can be read out via the signal lines 203. Therefore, it is possible to mix signals based on electric charges of the photodiodes 301 (R) in the pixel cell 201 (x, 2) and the pixel cell 201 (x, 3).

All PTX2(y) are fixed to be low regardless of high/low of TX2_EN(y) because a signal ptx2_rd is fixed to be low. Therefore, signals based on electric charges of the photodiodes 302 (Gr) in all the pixel cells 201 are not read out.

Thereafter, from the time T11c to a time T12c, a row to be selected is changed and operation similar to the above operation is performed. The photodiodes 302 (Gr) in the pixel cells 201 (0, y11) to (m, y11) (y11 is 1 to 4) are read out. In this case, signals based on the photodiodes 302 (Gr) in the pixel cell 201 (x, 1) and the pixel cell 201 (x, 2) are mixed, and signals based on electric charges of the photodiodes 302 (Gr) in the pixel cell 201 (x, 3) and the pixel cell 201 (x, 4) are mixed.

Thereafter, similarly, a row to be selected is shifted while reading out signals based on electric charges of the photodiodes 301 (R) and reading out signals based on electric charges of the photodiodes 302 (Gr) are being switched in the unit of horizontal synchronization signal HD.

In the case of this driving method (same color column read-out, signal mixing processing is performed), row selection timings of PSEL1(y) and PTX1(y) are not the same. Further, row selection timings of PSEL2(y) and PTX2(y) are not the same. However, the PTX enable generation unit 4107 is provided, and therefore the read-out scanning decode bit holding unit 4103 is used in common for PSEL and PTX, and thus the scanning circuit is simplified. In this case, signals ptx1_rd and ptx2_rd are to be alternately transition in the unit of horizontal synchronization signal HD.

According to this example, it is possible to connect adjacent pixel cells to the same signal line to perform the signal mixing processing. With this signal mixing processing, signals based on electric charges of a plurality of photodiodes can be formed into a single signal. This makes it possible to increase a speed of operation of reading out signals from a plurality of pixel cells 201, as compared with the driving method in Example 1.

The driving method in this example and the driving method in Example 1 can be switched and used. In this case, it is possible to select the driving method in Example 1, which can simplify processing in which the following system rearranges the order of signals, or the driving method in this example, which can perform read-out at a high speed as compared with the driving method in Example 1.

The vertical scanning unit 103 in this example can realize the driving methods in Example 1 and this example.

In this example, signals to be subjected to the mixing processing are signals based on electric charges of photodiodes of the same color. However, the signals are not limited to this example. For example, the pixel cells 201 may be monochrome pixel cells 201 that include no color filter, and therefore signals to be mixed may not be signals based on electric charges of photodiodes of the same color.

EXAMPLE 3

Regarding an image pickup device in this example, a difference between this example and Example 1 will be mainly described. In the image pickup device in this example, a single pixel cell includes four photodiodes, which is different from the pixel cell 201 in Example 1. Read-out operation of signals from pixel cells is also different from the operation in Example 1.

Figure 7:
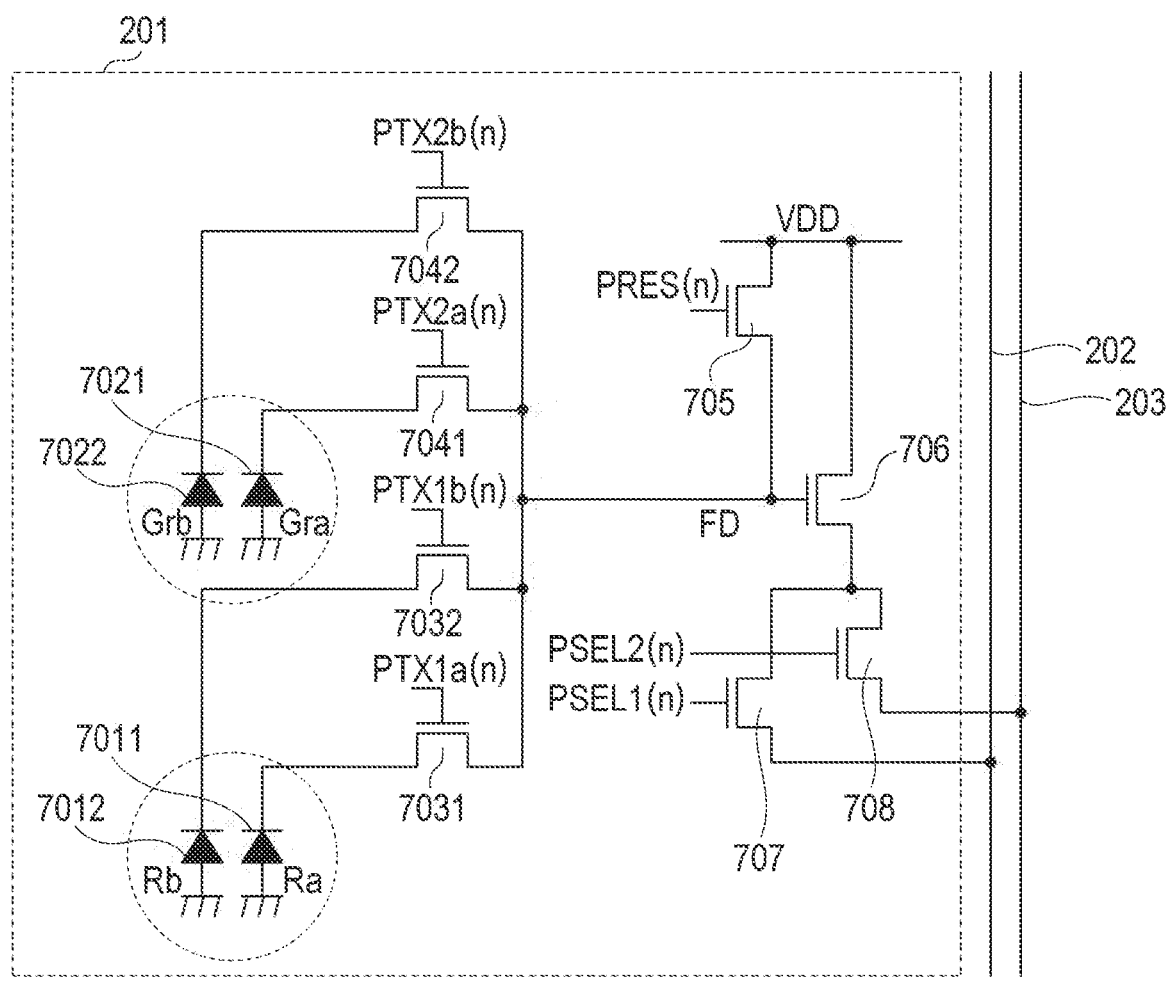
FIG. 7 illustrates a configuration of a pixel cell.

FIG. 7 illustrates a configuration example of the pixel cell 201 in the nth row according to this example.

The pixel cell 201 includes four photodiodes 7011, 7012, 7021, and 7022, transfer transistors 7031, 7032, 7041, and 7042, and an input node FD. The pixel cell 201 further includes a reset transistor 705, an amplification transistor 706, and selection transistors 707 and 708.

The transfer transistors 7031, 7032, 7041, and 7042 are connected between the photodiodes 7011, 7012, 7021, and 7022 and the input node FD.

Light that has been transmitted through a green color filter is incident on the photodiodes 7021 and 7022 in the mth column. The photodiodes 7021 and 7022 in the mth column share a single microlens. The photodiodes 7021 and 7022 that share the single microlens are Gr pixels.

Light that has been transmitted through a red color filter is incident on the photodiodes 7011 and 7012 in the mth column. The photodiodes 7011 and 7012 in the mth column share a single microlens. The photodiodes 7011 and 7012 that share the single microlens are R pixels.

Light that has been transmitted through a blue color filter is incident on photodiodes 7021 and 7022 (not illustrated) in the (m+1)th column. The photodiodes 7021 and 7022 in the (m+1)th column share a single microlens. The photodiodes 7021 and 7022 that share the single microlens are B pixels.

Light that has been transmitted through a green color filter is incident on photodiodes 7011 and 7012 (not illustrated) in the (m+1)th column. The photodiodes 7011 and 7012 in the (m+1)th column share a single microlens. The photodiodes 7011 and 7012 that share the single microlens are Gb pixels.

As described above, the pixel cell 201 in the mth column and the pixel cell in the (m+1)th column, which are arranged in the nth row, form a Bayer pattern.

Figure 8:
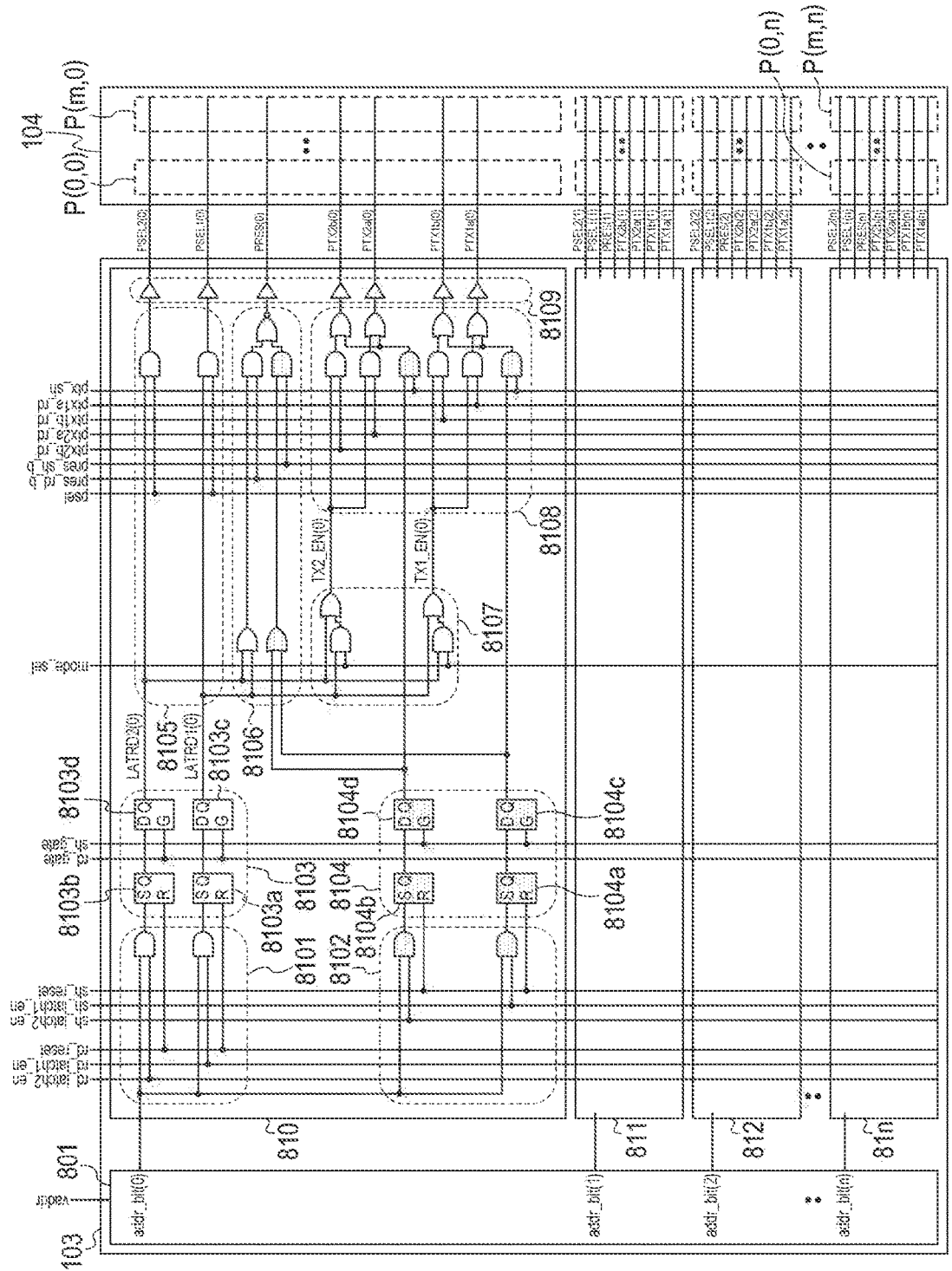
FIG. 8 illustrates a configuration of a vertical scanning unit.

FIG. 8 is a block diagram illustrating a configuration example of the vertical scanning unit 103 according to this example.

The vertical scanning unit 103 includes an address decoder unit 801 and the row driving units 810 to 81n. The address decoder unit 801 decodes an address signal vaddr generated in the control unit 102 to addr_bit(0) to (n).

The row driving unit 810 includes a read-out scanning setting unit 8101 and a shutter scanning setting unit 8102. The row driving unit 810 further includes a read-out scanning decode bit holding unit 8103 and a shutter scanning decode bit holding unit 8104. The row driving unit 810 further includes a PSEL generation unit 8105, a PRES generation unit 8106, a PTX enable generation unit 8107, a PTX generation unit 8108, and a level shift unit 8109. The level shift unit 8109 is a circuit for shifting a level of an input signal to an electric potential at a level suitable to be used as a control signal for a transistor.

The PTX generation unit 8108 is different from the PTX generation unit in Example 1, and therefore description will be made below.

The PTX generation unit 8108 is configured by a logic circuit in which output TX1_EN(0) and TX2_EN(0) of the PTX enable generation unit 8107, output of the decode bit holding unit 8104, and signals ptx1a_rd, ptx1b_rd, ptx2a_rd, ptx2b_rd, and ptx_sh generated in the control unit 102 are combined. Signals before level shift of driving signals PTX1a(0), PTX1b(0), PTX2a(0), and PTX2b(0) in a pixel are generated by a combinational logic circuit illustrated in FIG. 8.

Note that, although an example of a generation circuit of signals has been described with reference to FIG. 4, the circuit configuration is not limited thereto.

Hereinafter, a method of driving an image pickup device according to this example will be described.

Figure 9:
FIG. 9 illustrates operation of an image pickup device.

FIG. 9 is a timing chart illustrating an example of operation of the vertical scanning unit 103 and the pixel unit 104 illustrated in FIG. 8. Note that this driving method is the same as the driving method in Example 1 other than operation of the PTX generation unit 8108. Although LATRD1(y), LATRD2(y), TX1_EN(y), and TX2_EN(y) in each row are not illustrated in the timing chart of FIG. 9, those signals are the same as the signals in FIG. 5.

In the driving method described herein, a signal based on an electric charge of the R pixel in the pixel cell 201 (x, y) and a signal based on an electric charge of the Gr pixel in the pixel cell 201 (x, y+1) are read out in parallel (different color parallel read-out). Signal mixing processing between the pixel cells is not performed.

In this driving method, output of a mode select signal mode_sel is low.

Reset operation of photodiodes will be described. Herein, as well as in the driving method in Example 1, description will be made by using a rolling shutter method as an example.

Reset/set operation of primary holding circuits 8104a and 8104b of the shutter scanning decode bit holding unit 8104 from a time T00 to a time T00c is performed in the same way as the driving method in Example 1.

Holding operation of secondary holding circuits 8104c and 8104d of the shutter scanning decode bit holding unit 8104 from the time T00c to a time T01c is performed in the same way as the driving method in Example 1.

A pixel driving signal in the same period of time, i.e., from the time T00c to the time T01c, will be described.

PRES(0) and PRES(1) transition in accordance with an inverted waveform of a signal pres_sh_b. Because PRES(0) and PRES(1) are high, the input nodes FD of the pixel cells 201 (0, 0) to (m, 0) and the pixel cells 201 (0, 1) to (m, 1) are in a reset state (electric potential based on power source voltage VDD). In this example, regardless of presence/absence of row selection, the input nodes FD are in a reset state except at a read-out time.

PTX1a(0), PTX1b(0), PTX2a(1), and PTX2b(1) transition in accordance with a waveform of a signal ptx_sh. At this time, PTX1a(0) and PTX1b(0) transition from low→high→low, and each of the photodiodes 7011 and 7012 (R pixels) in the pixel cells 201 (0, 0) to (m, 0) is reset. Similarly, PTX2a(1) and PTX2b(1) transition from low→high→low, and each of the photodiodes 7021 and 7022 (Gr pixels) in the pixel cells 201 (0, 1) to (m, 1) is reset.

Thereafter, from the time T01c to a time T02c, a row to be selected is changed and operation similar to the above operation is performed. The photodiodes 7011 and 7012 (R pixels) in the pixel cells 201 (0, 1) to (m, 1) are reset. Further, the photodiodes 7021 and 7022 (Gr pixels) in the pixel cells 201 (0, 2) to (m, 2) are reset.

Thereafter, similarly, the photodiodes 7011 and 7012 (R pixels) and the photodiodes 7021 and 7022 (Gr pixels) are reset while a row to be selected is being changed. Finally, the photodiodes 7011 and 7012 (R pixels) in the pixel cells 201 (0, n−1) to (m, n−1) are reset. Further, the photodiodes 7021 and 7022 (Gr pixels) in the pixel cells 201 (0, n) to (m, n) are reset.

Next, read-out operation of signals based on electric charges of the photodiodes will be described.

Reset/set operation of primary holding circuits 8103a and 8103b of the read-out scanning decode bit holding unit 8103 from a time T10 to a time T10c is performed in the same way as the driving method in Example 1.

Holding operation of secondary holding circuits 8103c and 8103d of the read-out scanning decode bit holding unit

8103 from the time T10*c* to a time T11*c* is performed in the same way as the driving method in Example 1.

Operation of the PTX enable generation unit 8107 in the same period of time, i.e., from the time T10*c* to the time T11*c* is performed in the same way as the driving method in Example 1.

A pixel driving signal in the same period of time, i.e., from the time T10*c* to the time T11*c* will be described.

Regarding PSEL1(y), only PSEL1(0) transitions in accordance with a waveform of a signal psel because LATRD1(0) is high. Therefore, in the pixel cells 201 (0, 0) to (m, 0), the selection transistors 707 are turned on to be connected to the signal lines 202. The other rows are not connected to the signal lines 202.

Regarding PSEL2(y), only PSEL2(1) transitions in accordance with a waveform of a signal psel because LATRD2(1) is high. Therefore, in the pixel cells 201 (0, 1) to (m, 1), the selection transistors 708 are turned on to be connected to the signal lines 203. The other rows are not connected to the signal lines 203.

Regarding PRES(y), PRES(0) and PRES(1) transition in accordance with an inverted waveform of a signal pres_rd_b because LATRD1(0) and LATRD2(1) are high. Therefore, in the pixel cells 201 (0, 0) to (m, 0) and the pixel cells 201 (0, 1) to (m,1), reset of the input nodes FD is canceled in a period in which pres_rd_b is high. In the other rows, the input nodes FD are held in a reset state.

Regarding PTX1a(y), only PTX1a(0) transitions from low→high→low→high→low in accordance with a waveform of a signal ptx1a_*rd* because TX1_EN(0) is high. Regarding PTX1b(y), only PTX1b(0) transitions from low→high→low in accordance with a waveform of a signal ptx1b_*rd* because TX1_EN(0) is high.

Therefore, first, signals based on electric charges of photodiodes 7011 (R pixels) in the pixel cells 201 (0, 0) to (m, 0) are read out via the signal lines 202. Then, electric charges accumulated in the photodiodes 7011 and 7012 (R pixels) in the same pixel cells 201 (0, 0) to (m, 0) are added in the input nodes FD. Signals based on the added electric charges are read out via the signal lines 202.

Regarding PTX2a(*y*), only PTX2a(1) transitions from low→high→low→high→low in accordance with a waveform of a signal ptx2a_*rd* because TX2_EN(1) is high. Regarding PTX2b(*y*), only PTX1b(1) transitions from low→high→low in accordance with a waveform of a signal ptx2b_*rd* because TX2_EN(1) is high. Therefore, first, signals based on electric charges of photodiodes 7021 (Gr pixels) in the pixel cells 201 (0, 1) to (m, 1) are read out via the signal lines 203. Then, similarly, electric charges accumulated in the photodiodes 7021 and 7022 (Gr pixels) in the same pixel cells 201 (0, 1) to (m, 1) are added in the input nodes FD. Signals based on the added electric charges are read out via the signal lines 203.

Thereafter, from the time T11*c* to a time T12*c*, a row to be selected is changed and operation the same as the above operation is performed. Signals based on electric charges of the photodiodes 7011 and 7012 (R pixels) in the pixel cells 201 (0, 1) to (m, 1) are read out. Further, signals based on electric charges of the photodiodes 7021 and 7022 (Gr pixels) in the pixel cells 201 (0, 2) to (m, 2) are read out.

Thereafter, similarly, signals based on electric charges of the photodiodes 7011 and 7012 (R pixels) and the photodiodes 7021 and 7022 (Gr pixels) are read out while a row to be selected is being changed. Finally, signals based on electric charges of the photodiodes 7011 and 7012 (R pixels) in the pixel cells 201 (0, n−1) to (m, n−1) are read out.

Further, signals based on electric charges of the photodiodes 7021 and 7022 (Gr pixels) in the pixel cells 201 (0, n) to (m, n) are read out.

In the case of this driving method (different color parallel read-out, signal mixing processing is not performed), row selection timings of PSEL1(y), PTX1a(y), and PTX1b (y) are the same, and row selection timings of PSEL2(y), PTX2a(y), and PTX2b(y) are the same. By using this, the read-out scanning decode bit holding unit 8103 is used in common for PSEL and PTX, and thus the scanning circuit is simplified.

The image pickup device in this example has an effect the same as that of the image pickup device in Example 1.

EXAMPLE 4

Regarding an image pickup device in this example, a difference between this example and Example 3 will be mainly described. Unlike the image pickup device in Example 3, the image pickup device in this example performs the operation of the signal mixing processing described in Example 2.

Figure 10:
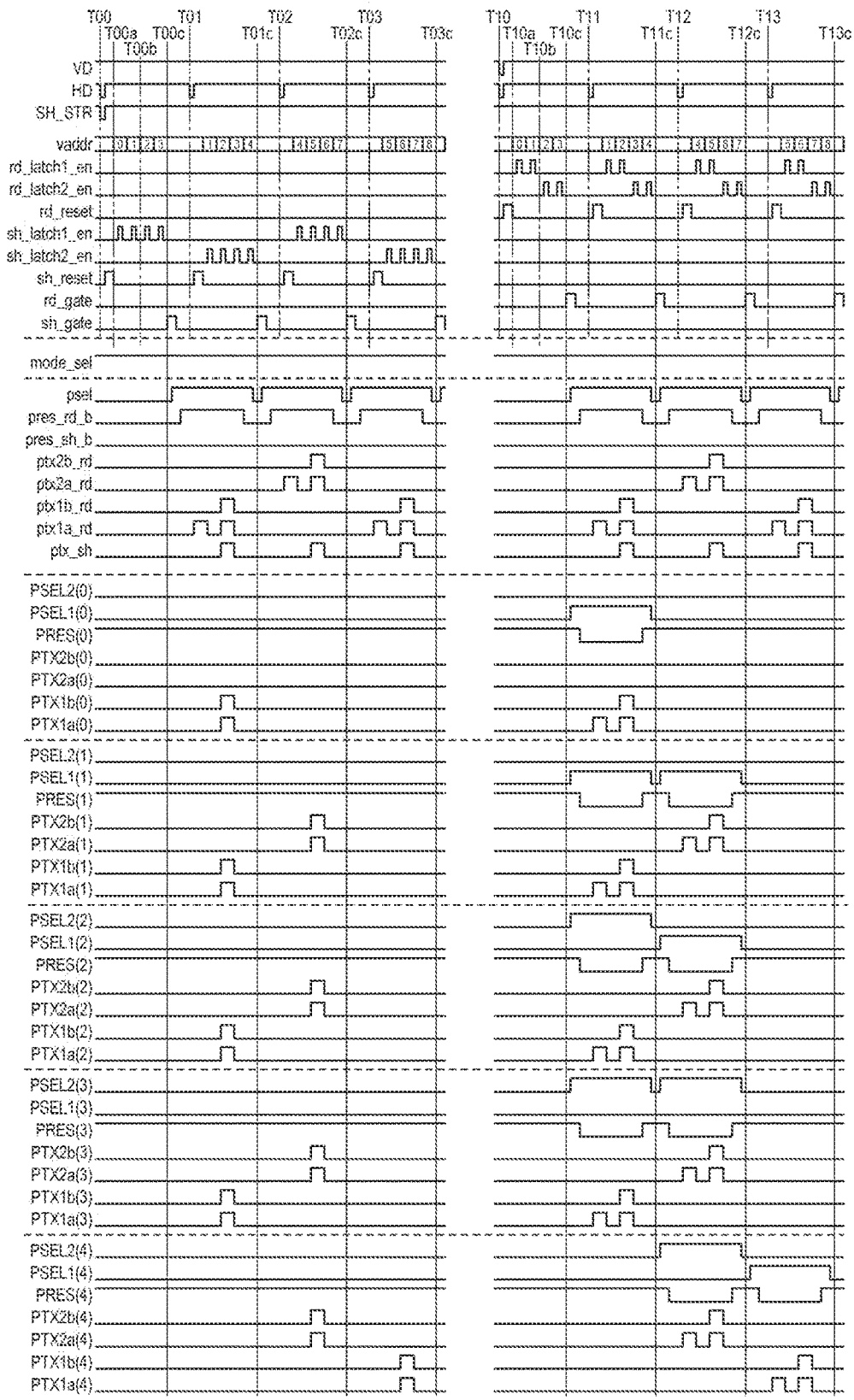
FIG. 10 illustrates operation of an image pickup device.

FIG. 10 is a timing chart illustrating an example of operation of the vertical scanning unit 103 and the pixel unit 104 illustrated in FIG. 8. Note that the driving method is the same as the driving method "same color column read-out" of Example 1 other than operation of the PTX generation unit 8108. Although LATRD1(y), LATRD2(y), TX1_EN(y), and TX2_EN(y) in each row are not illustrated in the timing chart of FIG. 10, those signals are the same as the signals in FIG. 6.

In the driving method described herein, signals based on electric charges of R pixels in the pixel cell 201 (x, y), the pixel cell 201 (x, y+1), the pixel cell 201 (x, y+2), and the pixel cell 201 (x, y+3) are read out in parallel (same color column read-out). The pixel cell 201 (x, y) and the pixel cell 201 (x, y+1) are connected to the same signal line 202, and the signal mixing processing is performed. Similarly, the pixel cell 201 (x, y+2) and the pixel cell 201 (x, y+3) are connected to the same signal line 203 and the signal mixing processing is performed. The number of pixel cells that are read out in parallel are large, as compared with the operation described in Example 3, and therefore it is possible to read out signals at a high speed, as compared with the operation in Example 3. In the case where signals of adjacent pixels are mixed, it is difficult to simultaneously read out an R pixel and a Gr pixel that share an input node FD. In this example, the same color column read-out is performed.

In this driving method, output of a mode select signal mode_sel is high.

Reset operation of photodiodes will be described. Herein, as well as in the driving method in Example 2, description will be made by using a rolling shutter method as an example.

Reset/set operation of the primary holding circuits 8104*a* and 8104*b* of the shutter scanning decode bit holding unit 8104 from a time T00 to a time T00*c* is performed in the same way as the driving method in Example 2.

Holding operation of the secondary holding circuits 8104*c* and 8104*d* of the shutter scanning decode bit holding unit 8104 from the time T00*c* to a time T01*c* is performed in the same way as the driving method in Example 2.

A pixel driving signal in the same period of time, i.e., from the time T00*c* to the time T01*c* will be described.

PRES(y00) (hereinafter, y00 is 0 to 3) transitions in accordance with an inverted waveform of a signal pres_sh_b. Because PRES(y00) is high, the input nodes FD of the pixel cells 201 (0, y00) to (m, y00) are in a reset state (electric potential based on power source voltage VDD). In this example, regardless of presence/absence of row selection, the input nodes FD are in a reset state except at a read-out time.

PTX1a(y00) and PTX1b(y00) transition in accordance with a waveform of a signal ptx_sh. At this time, PTX1a (y00) and PTX1b(y00) transition from low→high→low, and the photodiodes 7011 and 7012 (R pixels) in the pixel cells 201 (0, y00) to (m, y00) are reset.

PTX2a(y) and PTX2b(y) are held to be low in all the rows in this period of time. Therefore, the photodiodes 7021 and 7022 (Gr pixels) are not reset.

Thereafter, from the time T01c to a time T02c, a row to be selected is changed and operation similar to the above operation is performed. The photodiodes 7021 and 7022 (Gr pixels) in the pixel cells 201 (0, y01) to (m, y01) (y01 is 1 to 4) are reset.

Next, read-out operation of signals based on electric charges of the photodiodes will be described.

Reset/set operation of the primary holding circuits 8103a and 8103b of the read-out scanning decode bit holding unit 8103 from a time T10 to a time T10c is performed in the same way as the driving method in Example 2.

Holding operation of the secondary holding circuits 8103c and 8103d of the read-out scanning decode bit holding unit 8103 from the time T10c to a time T11c is performed in the same way as the driving method in Example 2.

Operation of the PTX enable generation unit 8107 in the same period of time, i.e., from the time T10c to the time T11c is performed in the same way as the driving method in Example 2.

A pixel driving signal in the same period of time, i.e., from the time T10c to the time T11c will be described.

PSEL1(y10_1) (hereinafter, y10_1 is 0 to 1) transitions in accordance with a waveform of a signal psel because LATRD1(y10_1) is high. Therefore, in the pixel cells 201 (0, y10_1) to (m, y10_1), the selection transistors 307 are turned on to be connected to the signal lines 202. The other rows are not connected to the signal lines 202.

PSEL2(y10_2) (hereinafter, y10_2 is 2 to 3) transitions in accordance with a waveform of a signal psel because LATRD2(y10_2) is high. Therefore, in the pixel cells 201 (0, y10_2) to (m, y10_2), the selection transistors 308 are turned on to be connected to the signal lines 203. The other rows are not connected to the signal lines 203.

PRES(y10_1) and PRES(y10_2) transition in accordance with an inverted waveform of a signal pres_rd_b because any one of LATRD1 and LATRD2 in the row is high. Therefore, in the pixel cells 201 (0, y10_1) to (m, y10_1) and the pixel cells 201 (0, y10_2) to (m, y10_2), reset of the input nodes FD is canceled in a period in which pres_rd_b is high. In the other rows, the input nodes FD are held to be in a reset state.

PTX1a(y10_1) transitions from low→high→low→high→low in accordance with a waveform of a signal ptx1a_rd because TX1_EN(y10_1) is high. PTX1b(y10_1) transitions from low→high→low in accordance with a waveform of a signal ptx1b_rd because TX1_EN(y10_1) is high. In this case, first, only PTX1a(y10_1) is high, and therefore signals based on electric charges of the photodiodes 7011 (R pixels) in the pixel cells 201 (0, y10_1) to (m, y10_1) are read out via the signal lines 202. Therefore, signals based on electric charges of the photodiodes 7011 (R pixels) in the pixel cell 201 (x, 0) and the pixel cell 201 (x, 1) can be mixed in the signal line 202. Then, PTX1a(y10_1) and PTX1b(y10_1) become high, and therefore the photodiodes 7011 and 7012 (R pixels) in the same pixel cells 201 (0, y10_1) to (m, y10_1) are added in the input nodes FD and are read out via the signal lines 202. Therefore, signals of the R pixels in the pixel cell 201 (x, 0), which are added in the input node FD, and signals of the R pixels in the pixel cell 201 (x, 1), which are added in the input node FD, can be mixed in the signal line 202.

PTX1a(y10_2) transitions from low→high→low→high→low in accordance with a waveform of a signal ptx1a_rd because TX1_EN(y10_2) is high. PTX1b(y10_2) transitions from low→high→low in accordance with a waveform of a signal ptx1b_rd because TX1_EN(y10_2) is high. In this case, first, only PTX1a(y10_2) is high, and therefore signals based on electric charges of the photodiodes 7011 (R pixels) in the pixel cells 201 (0, y10_2) to (m, y10_2) are read out via the signal lines 203. Therefore, signals of the photodiodes 7011 (R pixels) in the pixel cell 201 (x, 2) and the pixel cell 201 (x, 3) can be mixed in the signal line 203. Then, PTX1a(y10_2) and PTX1b(y10_2) become high, and therefore the photodiodes 7011 and 7012 (R pixels) in the same pixel cells 201 (0, y10_2) to (m, y10_2) are added in the input nodes FD and are read out via the signal lines 203. Therefore, the R pixels in the pixel cell 201 (x, 2), which are added in the input node FD, and the R pixels in the pixel cell 201 (x, 3), which are added in the input node FD, can be mixed in the signal line 203.

All PTX2a(y) and PTX2b(y) are fixed to be low regardless of high/low of TX2_EN(y) because a signal ptx2_rd is fixed to be low. Therefore, the photodiodes 7021 and 7022 (Gr pixels) in all the pixel cells 201 are not read out.

Thereafter, a row to be selected is changed and operation similar to the above operation is performed from the time T11c to the time T12c. The photodiodes 302 (Gr pixels) in the pixel cells 201 (0, y11) to (m, y11) (y11 is 1 to 4) are read out. In this case, signals of Gr pixels in the pixel cell 201 (x, 1) and the pixel cell 201 (x, 2) are mixed, and signals of Gr pixels in the pixel cell 201 (x, 3) and the pixel cell 201 (x, 4) are mixed.

Thereafter, similarly, a row to be selected is shifted while reading out signals based on electric charges of the photodiodes 7011 and 7012 (R pixels) and reading out signals based on electric charges of the photodiodes 7021 and 7022 (Gr pixels) are being switched in the unit of horizontal synchronization signal HD.

In the case of this driving method (same color column read-out, signal mixing processing is performed), row selection timings of PSEL1(y), PTX1a(y), and PTX1b(y) are not the same. Further, row selection timings of PSEL2(y), PTX2a(y), and PTX2b(y) are not the same. However, the PTX enable generation unit 8107 is provided, and therefore the read-out scanning decode bit holding unit 8103 is used in common for PSEL and PTX, and thus the scanning circuit is simplified. In this case, it is necessary to cause signals (ptx1a_rd, ptx1b_rd) and (ptx2a_rd, ptx2b_rd) to alternately transition in the unit of horizontal synchronization signal HD.

The image pickup device in this example has an effect the same as that of the image pickup device in Example 2. Further, the driving method described in Example 3 and the driving method in this example may be switched and operated.

In Example 3 and this example, description has been made based on a configuration in which a pixel has four photodiodes. However, the configuration is not limited to this example and more photodiodes may be provided.

Note that, in Example 3 and this example, the following case has been described: a signal (referred to as "first signal") based on an electric charge of only one of a plurality of photodiodes that share a single microlens is read out from the pixel cell 201, and a signal (referred to as "second signal") based on an electric charge obtained by adding electric charges of the plurality of photodiodes is read out from the pixel cell 201. By using the first signal and a signal (third signal) obtained by subtracting the first signal from the second signal, it is possible to detect a phase difference between light incident on one of the photodiodes and light incident on the other one of the photodiodes. By using this phase difference, it is possible to perform focus detection. By using the second signal, it is possible to generate an image. This processing in which the first signal is subtracted from the second signal, focus detection using a phase difference, and generation of an image may be performed by a signal processing unit provided outside the image pickup device, the signal processing unit being a unit to which signals of the image pickup device are input. Note that the outside of the image pickup device may be a chip the same as a chip on which the image pickup device is provided. For example, a single chip may be formed by laminating a semiconductor substrate on which the signal processing unit is provided on a semiconductor substrate on which the image pickup device is provided. Further, this signal processing unit may be provided inside the image pickup device, i.e., on the same semiconductor substrate as the semiconductor substrate on which the image pickup device is provided. Alternatively, a part of the processing in which the first signal is subtracted from the second signal, focus detection using a phase difference, and generation of an image may be performed inside the image pickup device, and the other part thereof may be performed outside the image pickup device.

EXAMPLE 5

This example is the same as Example 2 in the configuration of the image pickup device and is different therefrom in the driving method.

In the driving method in Example 2, an example of mixing signals in two pixel cells 201 has been described. In this example, signals of three pixel cells 201 are mixed. Further, electric charges of all photodiodes are sequentially transferred to the input nodes FD.

Figure 11:
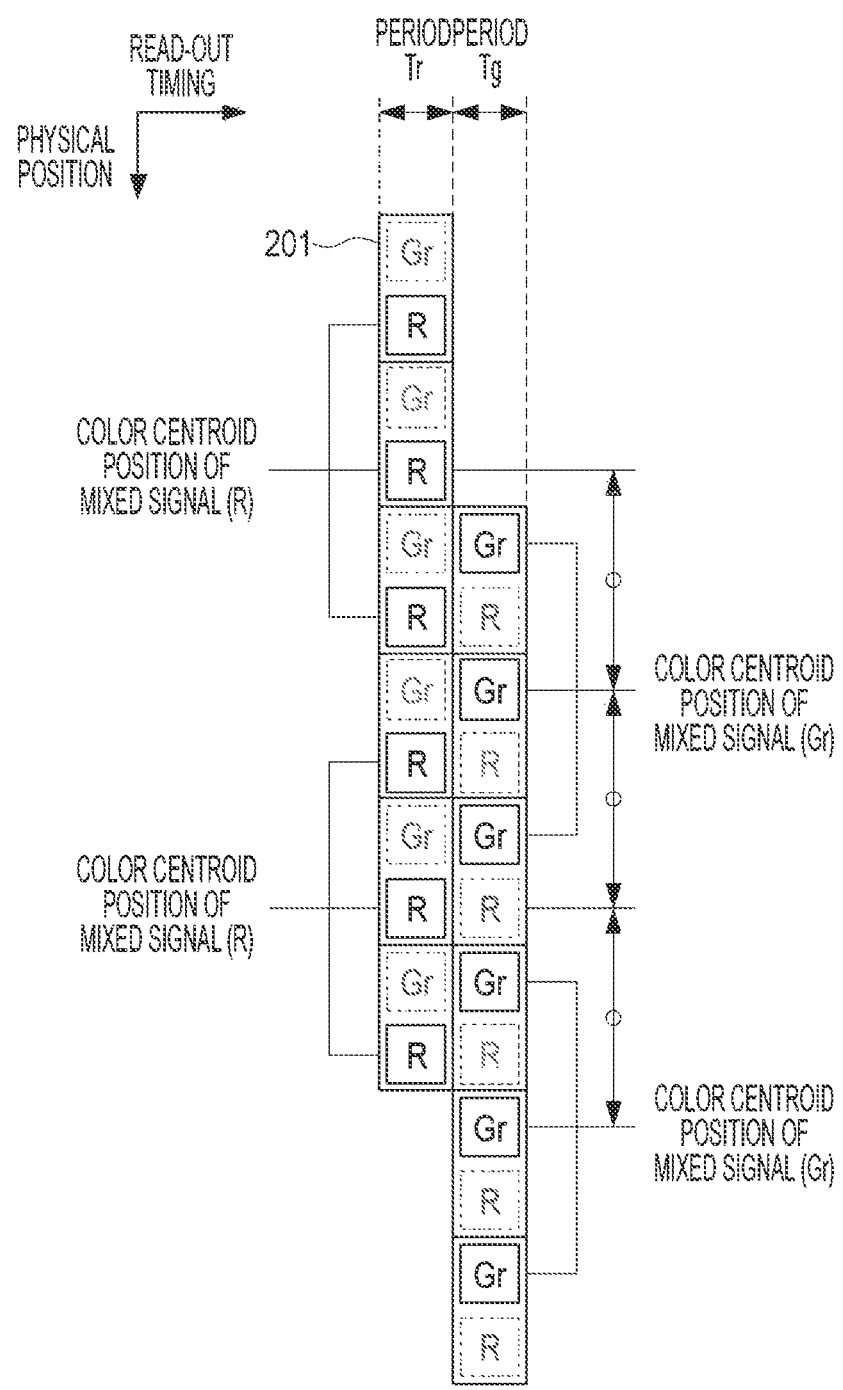
FIG. 11 is a diagram in which operation of an image pickup device and arrangement of pixel cells are illustrated together.

FIG. 11 is a diagram in which read-out operation of signals in this example, color of light incident on photodiodes, and layout of the photodiodes are illustrated together. A driving method in this example is the same as the driving method in Example 2 except that the number of rows of the pixel cells 201 whose signals are mixed is changed from two rows to three rows.

In this case, distances between a color centroid of signals of R pixels subjected to the mixing processing and a color centroid of signals of Gr pixels subjected to the mixing processing are equal. With this, a satisfactory color characteristic is obtained in an image generated by using signals output by the image pickup device.

EXAMPLE 6

Differences between this example and Examples 1 and 2 will be mainly described.

A configuration of the image pickup device in this example is the same as the configurations in Example 1 and Example 2. In Example 1, there has been described the driving method in which the different color parallel read-out is performed without performing the signal mixing processing. In Example 2, there has been described the driving method in which the signal mixing processing is performed in the same color column read-out. This example is a driving method in which the signal mixing processing is performed in the different color parallel read-out.

Figure 12:
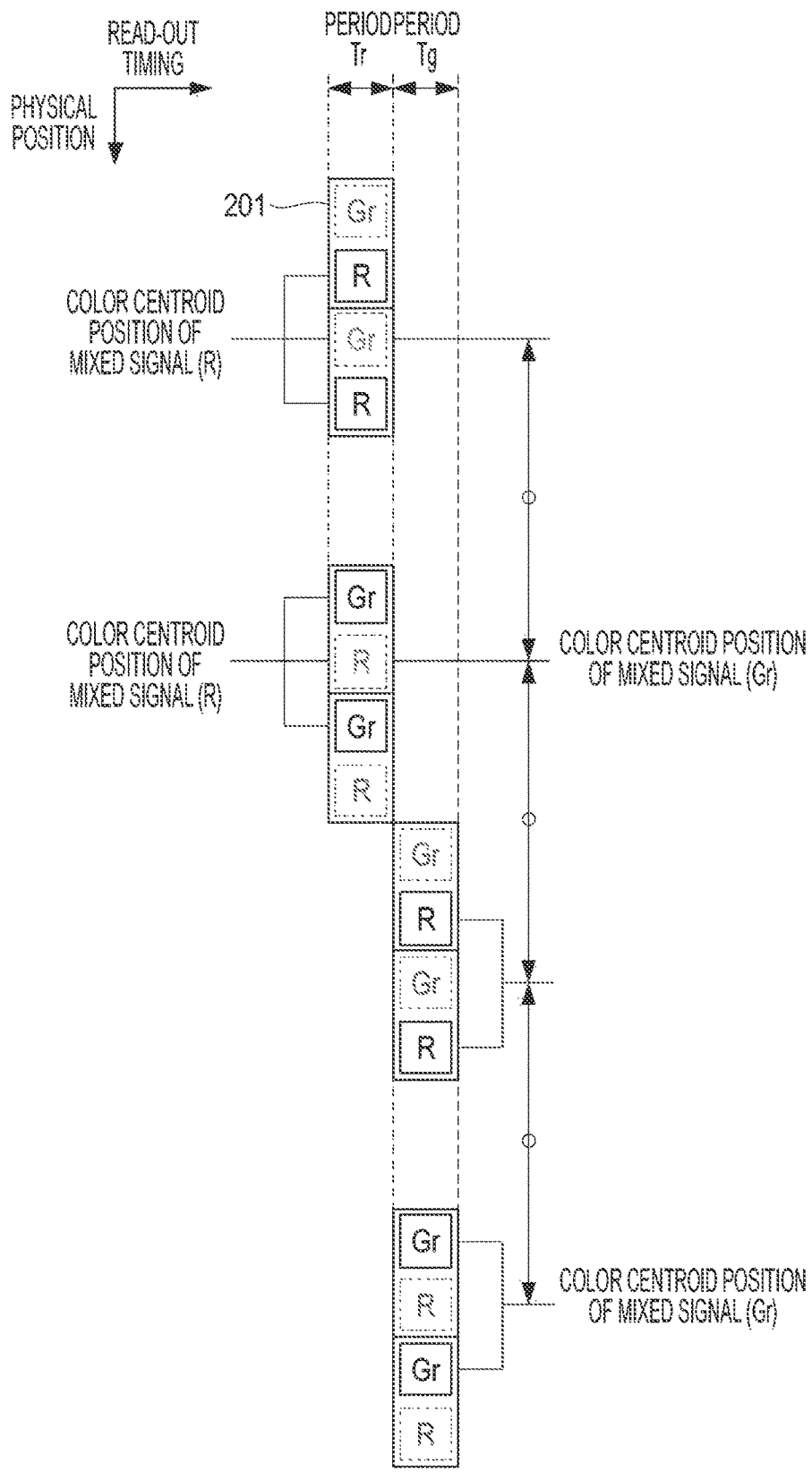
FIG. 12 is a diagram in which operation of an image pickup device and arrangement of pixel cells are illustrated together.

FIG. 12 schematically illustrates the driving method in this example. FIG. 12 is a diagram in which layout of the photodiodes 301 and 302, and a read-out timing are illustrated together. In this example, signals based on electric charges of the photodiodes 301 of R in the pixel cell 201 (x, y) and the pixel cell 201 (x, y+1) and signals based on electric charges of the photodiodes 302 of Gr in the pixel cell 201 (x, y+3) and the pixel cell 201 (x, y+4) are read out in parallel. In other words, the different color parallel read-out is performed. Signals based on electric charges of R in the pixel cell 201 (x, y) and the pixel cell 201 (x, y+1) are mixed in one of the signal line 202 and the signal line 203. Further, signals based on electric charges of the photodiodes 302 of Gr in the pixel cell 201 (x, y+3) and the pixel cell 201 (x, y+4) are mixed in the other one of the signal line 202 and the signal line 203. In this example, signals are read out from photodiodes 301 of R in two pixel cells 201 among photodiodes 301 of R in five pixel cells 201. No signal is read out from photodiodes 301 of R in the remaining three pixel cells 201. Similarly, signals are read out from photodiodes 301 of Gr in two pixel cells 201 among photodiodes 301 of Gr in five pixel cells 201. No signal is read out from photodiodes 301 of Gr in the remaining three pixel cells 201. As described above, in this example, the number of pixel cells provided between several pixel cells, which output signals to be mixed in a first signal line, and the number of pixel cells provided between several other pixel cells, which output signals to be mixed in a second signal line, are set to be the same.

Figure 13:
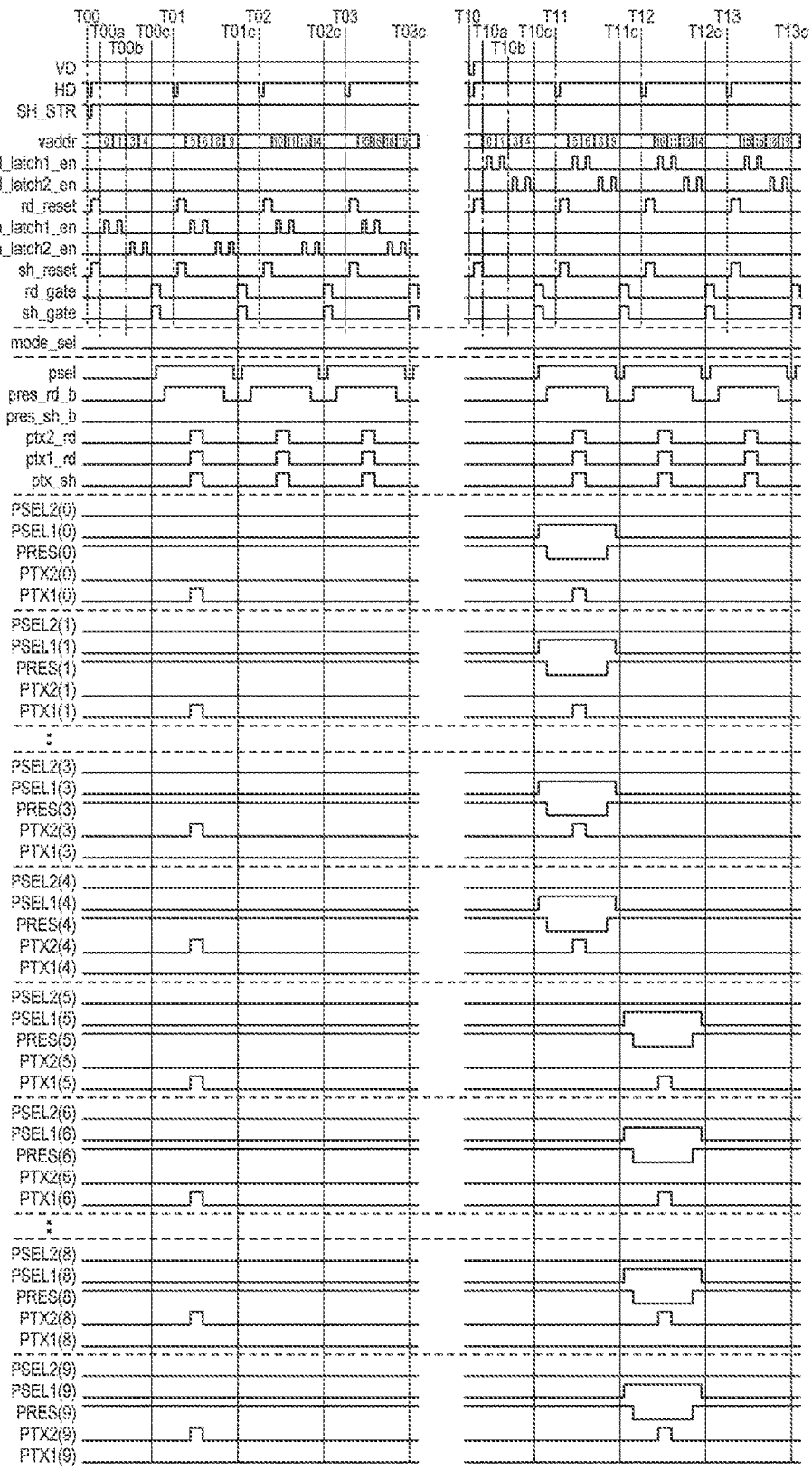
FIG. 13 illustrates operation of an image pickup device.

FIG. 13 is a timing chart illustrating driving in this example.

In this driving method, output of a mode select signal mode_sel is low.

Reset operation of photodiodes will be described. Herein, as well as in the driving method (different color parallel read-out), description will be made by using a rolling shutter method as an example. An interval between a shutter start signal SH_STR and a vertical synchronization signal VD corresponds to an exposure time period.

The reset operation of the photodiodes is started at a time T00. The CPU 101 inputs a shutter start signal SH_STR and a horizontal synchronization signal HD to the control unit 102. Then, from the time T00 to a time T00a, the primary holding circuits 4104a and 4104b of the shutter scanning decode bit holding unit 4104 are reset all together.

Then, from the time T00a to a time T00b, the primary holding circuits 4104a of the shutter scanning decode bit holding units 4104 for two rows are set. First, the control unit 102 sets vaddr to 0, and addr_bit(0) of the address decoder unit 401 outputs a high level. At this time, the other signals addr_bit(1) to addr_bit(n) output a low level. Herein, a signal sh_latch1_en is caused to transition from low→high→low to set high in the primary holding circuit 4104a in the 0th row. Thereafter, similarly, the control unit 102 sets vaddr to 1 to set high in the primary holding circuit 4104a in the 1st row.

Then, from the time T00b to a time T00c, the primary holding circuits 4104b of the shutter scanning decode bit holding units 4104 for two rows are set. The control unit 102 sets vaddr to 3, and a signal sh_latch2_en is caused to transition from low→high→low to set high in the primary holding circuit 4104b in the 3rd row. Thereafter, similarly, the control unit 102 sets vaddr to 4 to set high in the primary holding circuit 4104b in the 4th row.

Then, from the time T00c to a time T01c, the secondary holding circuits 4104c and 4104d of the shutter scanning decode bit holding unit 4104 perform holding operation. The control unit 102 causes a signal sh_gate to transition from low→high→low. Then, in the vertical scanning unit 103, the secondary holding circuits 4104c of all the shutter scanning decode bit holding units obtain output of Q of the primary holding circuits 4104a. Similarly, the secondary holding circuits 4104d of all the shutter scanning decode bit holding units obtain output of Q of the primary holding circuits 4104b. Therefore, in this period, Q of the secondary holding circuits 4104c in the 0th row and the 1st row continuously outputs high, and Q of the secondary holding circuits 4104d in the 3rd row and the 4th row continuously outputs high. Further, Q of the secondary holding circuits 4104c and 4104d in the other rows continuously outputs low.

A pixel driving signal in a similar period of time, i.e., from the time T00c to the time T01c will be described.

Regarding PRES(y), regardless of presence/absence of row selection, the input nodes FD are in a reset state except at a read-out time.

PTX1(y00_1) (y00_1 is 0 to 1) transitions in accordance with a waveform of a signal ptx_sh. At this time, PTX1 (y00_1) transitions from low→high→low, and the photodiodes 301 of R in the pixel cells 201 (0, y00_1) to (m, y00_1) are reset.

PTX2(y00_2) (y00_2 is 3 to 4) transitions in accordance with a waveform of a signal ptx_sh. At this time, PTX2 (y00_2) transitions from low→high→low, and the photodiodes 302 of Gr in the pixel cells 201 (0, y00_2) to (m, y00_2) are reset.

Thereafter, from the time T01c to the time T02c, a row to be selected is changed and operation similar to the above operation is performed. The photodiodes 301 of R in the pixel cells 201 (0, y01_1) to (m, y01_1) (y01_1 is 5 to 6) are reset. Further, the photodiodes 302 of Gr in the pixel cells 201 (0, y01_2) to (m, y01_2) (y01_2 is 8 to 9) are reset.

Thereafter, similarly, the photodiodes 301 and 302 are reset while a row to be selected is being shifted.

Next, read-out operation of photodiodes will be described.

The read-out operation of the photodiodes is started at a time T10. The CPU 101 inputs a vertical synchronization signal VD and a horizontal synchronization signal HD to the control unit 102.

Then, from the time T10 to a time T10a, the primary holding circuits 4103a and 4103b of the read-out scanning decode bit holding units 4103 are reset all together.

Then, from the time T10a to a time T10b, the primary holding circuits 4103a of the read-out scanning decode bit holding units 4103 for two rows are set. The control unit 102 sets vaddr to 0, and addr_bit(0) of the address decoder unit 401 outputs a high level. At this time, a signal rd_latch1_en is caused to transition from low→high→low to set high in the primary holding circuit 4103a in the 0th row. Thereafter, similarly, the control unit 102 sets vaddr to 1 to set high in the primary holding circuit 4103a in the 1st row.

Then, from the time T10b to a time T10c, the primary holding circuits 4103b of the read-out scanning decode bit holding units 4103 for two rows are set. The control unit 102 sets vaddr to 3, and addr_bit(3) of the address decoder unit 401 outputs a high level. At this time, a signal rd_latch2_en is caused to transition from low→high→low to set high in the primary holding circuit 4103b in the 3rd row. Thereafter, similarly, the control unit 102 sets vaddr to 4 to set high in the primary holding circuit 4103b in the 1st row.

Then, from the time T10c to a time T11c, the secondary holding circuits 4103c and 4103d of the read-out scanning decode bit holding units 4103 perform holding operation. The control unit 102 causes a signal rd_gate to transition from low→high→low. Then, in the vertical scanning unit 103, the secondary holding circuits 4103c of all the read-out scanning decode bit holding units obtain output of Q of the primary holding circuits 4103a. Similarly, the secondary holding circuits 4103d of all the read-out scanning decode bit holding units obtain output of Q of the primary holding circuits 4103b. Therefore, in this period, Q (LATRD1(0), LATRD1(1)) of the secondary holding circuits 4103c in the 0th row and the 1st row continuously outputs high. Further, in this period, Q (LATRD2(3), LATRD2(4)) of the secondary holding circuits 4104d in the 3rd row and the 4th row continuously outputs high, and Q of the secondary holding circuits 4104d in the other rows continuously outputs low.

Operation of the PTX enable generation unit 4107 in a similar period of time, i.e., from the time T10c to the time T11c will be described. In the (y10_1)th row (y00_1 is 0 to 1), mode_sel is low and LATRD1(y10_1) is high, and therefore TX1_EN(y10_1) becomes high. In the (y10_2)th row (y00_2 is 3 to 4), mode_sel is low and LATRD2(y10_2) is high, and therefore TX2_EN(y10_2) becomes high.

A pixel driving signal in the similar period of time, i.e., from the time T10c to the time T11c will be described.

PSEL1(y10_1) transitions in accordance with a waveform of a signal psel because LATRD1(y10_1) is high. Therefore, in the pixel cells 201 (0, y10_1) to (m, y10_1), the selection transistors 307 are turned on to be connected to the signal lines 202. The other rows are not connected to the signal lines 202.

PSEL2(y10_2) transitions in accordance with a waveform of a signal psel because LATRD2(1) is high. Therefore, in the pixel cells 201 (0, y10_2) to (m, y10_2), the selection transistors 308 are turned on to be connected to the signal lines 203. The other rows are not connected to the signal lines 203.

PRES(y10_1) and PRES(y10_2) transition in accordance with an inverted waveform of a signal pres_rd_b because LATRD1(y10_1) or LATRD2(y10_2) is high. Therefore, in the pixel cells 201 (0, y0_1) to (m, y10_1) and the pixel cells 201 (0, y10_2) to (m, y10_2), reset of the input nodes FD is canceled in a period in which pres_rd_b is high. In the other rows, the input nodes FD are held to be in a reset state.

PTX1(y10_1) transitions in accordance with a waveform of a signal ptx1_rd because TX1_EN(y10_1) is high. Therefore, the photodiodes 301 of R in the pixel cells 201 (0, y10_1) to (m, y10_1) can be read out via the signal lines 202. Therefore, it is possible to mix signals based on electric charges of the photodiodes 301 of R in the pixel cell 201 (x, 0) and the pixel cell 201 (x, 1) in the signal line 202.

Regarding PTX2(y10_2), only PTX2(y10_2) transitions in accordance with a waveform of a signal ptx2_rd because TX2_EN(y10_2) is high. Therefore, the photodiodes 302 of Gr in the pixel cells 201 (0, y10_2) to (m, y10_2) can be read out via the signal lines 203. Therefore, it is possible to mix signals based on electric charges of the photodiodes 302 of Gr in the pixel cell 201 (x, 3) and the pixel cell 201 (x, 4) in the signal line 203.

Thereafter, from a time T11c to a time T12c, a row to be selected is changed and operation similar to the above operation is performed. The photodiodes 301 of R in the pixel cells 201 (0, y11_1) to (m, y11_1) (y11_1 is 5 to 6) are read out. In this case, signals based on electric charges of the photodiodes 301 of R in the pixel cell 201 (x, 5) and the pixel cell 201 (x, 6) are mixed. Further, signals based on electric charges of the photodiodes 302 of Gr in the pixel cells 201 (0, y11_2) to (m, y11_2) (y11_2 is 8 to 9) are mixed. In this case, signals based on electric charges of the photodiodes 302 of Gr in the pixel cell 201 (x, 8) and the pixel cell 201 (x, 9) are mixed.

In this example, distances between a color centroid of the photodiodes 301 of R subjected to the signal mixing processing and a color centroid of the photodiodes 302 of Gr subjected to the signal mixing processing are equal. Therefore, a satisfactory color characteristic is obtained in an image generated by using signals output by the image pickup device.

EXAMPLE 7

This example relates to an image pickup system including the image pickup device in each example described above.

Figure 14:
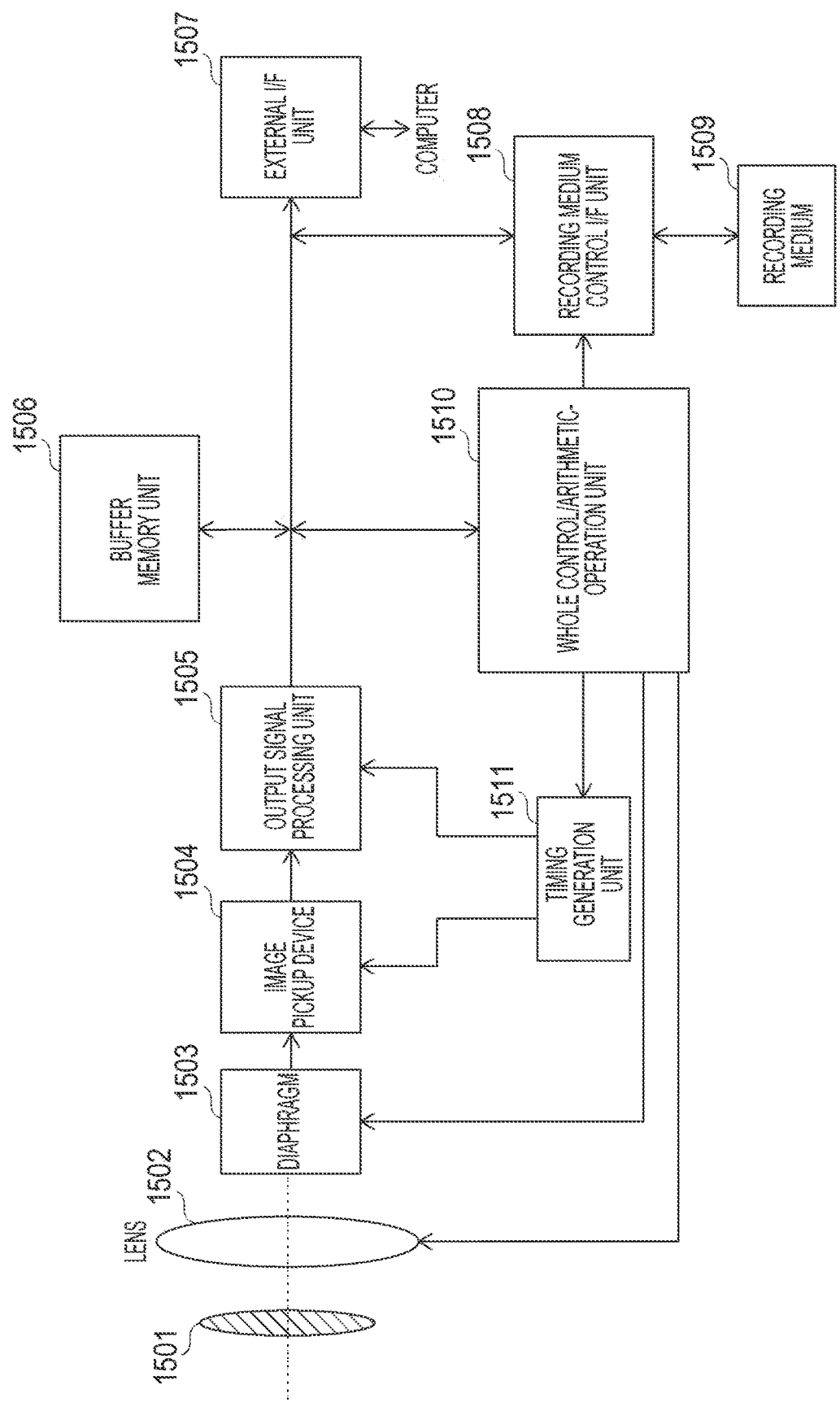
FIG. 14 illustrates a configuration of an image pickup system.

The image pickup system is, for example, a digital still camera, a digital camcorder, or a monitoring camera. FIG. 14 is a schematic diagram obtained in the case where the image pickup device is applied to a digital still camera as an example of the image pickup system.

The image pickup system illustrated in FIG. 14 includes a barrier 1501 for protecting a lens, a lens 1502 for forming an optical image of an object on an image pickup device 1504, and a diaphragm 1503 for making an amount of light passing through the lens 1502 variable. The lens 1502 and the diaphragm 1503 are an optical system for collecting light into the image pickup device 1504. The image pickup system illustrated in FIG. 14 further includes an output signal processing unit 1505 for processing an output signal output by the image pickup device 1504. The output signal processing unit 1505 performs various kinds of correction and compression and outputs signals as necessary.

The image pickup system illustrated in FIG. 14 further includes a buffer memory unit 1506 for temporarily storing image data and an external interface unit 1507 for communicating with an external computer or the like. The image pickup system further includes a detachable recording medium 1509 such as a semiconductor memory on which/from which image pickup data is recorded or is read out and a recording medium control interface unit 1508 for recording or reading out the image pickup data on/from the recording medium 1509. The image pickup system further includes a whole control arithmetic-operation unit 1510 for controlling various kinds of arithmetic operation and the whole digital still camera and a timing supply unit 1511 for outputting various timing signals to the image pickup device 1504 and the output signal processing unit 1505. Herein, a timing signal and the like may be input from the outside, and the image pickup system includes at least the image pickup device 1504 and the output signal processing unit 1505 for processing an output signal output from the image pickup device 1504.

Note that the output signal processing unit 1505 can be a signal processing unit for performing focus detection described in Example 4.

As described above, the image pickup system in this example can perform image pickup operation by applying the image pickup device 1504.

Note that all the above examples only show specific examples to implement the aspect of the embodiments, and a technical scope of the aspect of the embodiments should not be interpreted in a limited manner by using those examples. That is, the disclosure can be variously implemented without departing from a technical idea thereof or a main characteristic thereof. Further, the examples described above can be implemented in various combinations.

There is provided a new technique for reading out signals from pixel cells to signal lines in a configuration in which a plurality of signal lines are provided with respect to pixel cells in a single column.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-234317, filed Nov. 30, 2015, which is hereby incorporated by reference herein in its entirety.

What is claimed is:

1. A method of driving an image pickup device,
the image pickup device including:
a plurality of pixel cells, each of the plurality of pixel cells including a plurality of photoelectric conversion units, a first selection transistor, a second selection transistor, and an amplification transistor; and
a first signal line and a second signal line,
the first selection transistor of a first pixel cell of the plurality of pixel cells being connected between the amplification transistor of the first pixel cell and the first signal line,
the first selection transistor of a second pixel cell of the plurality of pixel cells being connected between the amplification transistor of the second pixel cell and the first signal line,
the second selection transistor of the first pixel cell being connected between the amplification transistor of the first pixel cell and the second signal line, and
the second selection transistor of the second pixel cell being connected between the amplification transistor of the second pixel cell and the second signal line,
the method comprising:
performing a first operation of controlling the first selection transistors so that a period in which the first selection transistor of the first pixel cell is in an on state overlaps a period in which the first selection transistor of the second pixel cell is in an on state.

2. The method according to claim 1, the method further comprising:
performing a second operation of controlling the second selection transistors so that a period in which the second selection transistor of one of the plurality of pixel cells is in an on state overlaps a period in which the second selection transistor of another one of the plurality of pixel cells is in an on state.

3. The method according to claim 2, wherein
each of the plurality of pixel cells includes a first color filter that allows light of first color to be incident on a part of the plurality of photoelectric conversion units and a second color filter that allows light of second color different from the first color to be incident on another part of the plurality of photoelectric conversion units, and
the method further comprises:
outputting a signal to the first signal line in the first operation, the signal being based on an electric charge of the part of the photoelectric conversion units; and
outputting a signal to the second signal line in the second operation, the signal being based on an electric charge of the another part of the photoelectric conversion units.

4. The method according to claim 3, wherein
each of the plurality of pixel cells includes a plurality of microlenses,
the part of the photoelectric conversion units is a plurality of photoelectric conversion units on which light transmitted through a single microlens is incident, and
the another part of the photoelectric conversion units is a plurality of photoelectric conversion units on which light transmitted through another single microlens is incident.

5. The method according to claim 2, wherein a number of pixel cells provided among the plurality of pixel cells in which the first selection transistors are connected to the first signal line and a number of pixel cells provided among the plurality of pixel cells in which the second selection transistors are connected to the second signal line are same.

6. The method according to claim 4, wherein a number of pixel cells provided among the plurality of pixel cells in which the first selection transistors are connected to the first signal line and a number of pixel cells provided among the plurality of pixel cells in which the second selection transistors are connected to the second signal line are same.

7. The method according to claim 2, wherein
the amplification transistor includes an input node to which an electric charge of each of the plurality of photoelectric conversion units is transferred, and
the method further comprises:
disconnecting, in the first operation, the input node of the amplification transistor of each of the several pixel cells to the input nodes of the other amplification transistors; and
disconnecting, in the second operation, the input node of the amplification transistor of each of the several other pixel cells to the input nodes of the other amplification transistors.

8. A method of driving an image pickup device,
the image pickup device including:
a plurality of pixel cells provided in a plurality of rows and a plurality of columns, each of the plurality of pixel cells including a plurality of photoelectric conversion units, a single amplification transistor connected to the plurality of photoelectric conversion units, a first selection transistor and a second selection transistor connected to the single amplification transistor, the second selection transistor being different from the first selection transistor, and a plurality of microlenses; and
a first signal line and a second signal line different from the first signal line,
the first signal line and the second signal line being provided corresponding to pixel cells in a single column,
the first selection transistor being connected to the first signal line,
the second selection transistor being connected to the second signal line,
a part of the plurality of pixel cells including a first color filter that allows light of first color to be incident on a part of the plurality of photoelectric conversion units,
another part of the plurality of pixel cells including a second color filter that allows light of second color to be incident on a part of the plurality of photoelectric conversion units,
the part of the photoelectric conversion units of the part of the pixel cells is a plurality of photoelectric conversion units on which light transmitted through a single microlens is incident, and
the part of the photoelectric conversion units of the another part of the pixel cells is a plurality of photoelectric conversion units on which light transmitted through another single microlens is incident,
the method comprising
first outputting period in which the first selection transistor of the part of the pixel cells outputs a signal based on an electric charge of the part of the photoelectric conversion units to the first signal line while the first selection transistor of the part of the pixel cells is in an on state, and
second outputting period in which the second selection transistor of the another part of the pixel cells outputs a signal based on an electric charge of the part of the photoelectric conversion units to the second signal line while the second selection transistor of the another part of pixel cells is in an on state,
wherein a part of the first outputting period and a part of second outputting period overlap.

9. The method according to claim 1, wherein
the image pickup device further includes a plurality of signal processing circuits,
the first signal line and the second signal line are connected to different signal processing circuits, and
the method further comprises
processing, by each of the plurality of signal processing circuits, one of a signal output from the first selection transistor via the first signal line and a signal output from the second selection transistor via the second signal line.

10. The method according to claim 8, wherein
the image pickup device further includes a plurality of signal processing circuits,
the first signal line and the second signal line are connected to different signal processing circuits, and
the method further comprises
processing, by each of the plurality of signal processing circuits, one of a signal output from the first selection transistor via the first signal line and a signal output from the second selection transistor via the second signal line.

11. An image pickup device, comprising:
a plurality of pixel cells, each of the plurality of pixel cells including a plurality of photoelectric conversion units, a first selection transistor, a second selection transistor, and an amplification transistor;
a first signal line and a second signal line different from the first signal line; and
a vertical scanning unit,
the first selection transistor of a first pixel cell of the plurality of pixel cells being connected between the amplification transistor of the first pixel cell and the first signal line,
the first selection transistor of a second pixel cell of the plurality of pixel cells being connected between the amplification transistor of the second pixel cell and the first signal line,
the second selection transistor of the first pixel cell being connected between the amplification transistor of the first pixel cell and the second signal line, and
the second selection transistor of the second pixel cell being connected between the amplification transistor of the second pixel cell and the second signal line,
wherein the vertical scanning unit supplies a signal to the first selection transistors such that a period in which the first selection transistor of the first pixel cell is in an on state overlaps a period in which the first selection transistor of the second pixel cell is in an on state.

12. An image pickup device, comprising:
a plurality of pixel cells provided in a plurality of rows and a plurality of columns, each of the plurality of pixel cells including a plurality of photoelectric conversion units, an amplification transistor connected to the plurality of photoelectric conversion units, and a first selection transistor and a second selection transistor connected to the amplification transistor, and a plurality of microlenses;
a first signal line and a second signal line, the first signal line and the second signal line being provided corresponding to pixel cells in a single column; and
a vertical scanning unit,
the first selection transistor being connected to the first signal line,
the second selection transistor being connected to the second signal line, and
each of the plurality of pixel cells including a first color filter that allows light of first color to be incident on a part of the plurality of photoelectric conversion units and a second color filter that allows light of second color to be incident on another part of the plurality of photoelectric conversion units,
wherein the part of the photoelectric conversion units of the part of the pixel cells is a plurality of photoelectric conversion units on which light transmitted through a single microlens is incident, and
the part of the photoelectric conversion units of the another part of the pixel cells is a plurality of photoelectric conversion units on which light transmitted through another single microlens is incident,
wherein the vertical scanning unit supplies a signal to the first selection transistor and a signal to the second selection transistor such that at least a part of a period in which the first selection transistor of a part of the plurality of pixel cells outputs a signal based on an electric charge of the part of the photoelectric conversion units to the first signal line while the first selection transistor of the part of the part of the pixel cells is in an on state and at least a part of a period in which the second selection transistor of the another part of the pixel cells outputs a signal based on an electric charge of the another part of the photoelectric conversion units to the second signal line while the second selection transistor of the another part of pixel cells is in an on state.

13. An image pickup system, comprising:
an image pickup device; and
a signal processing unit configured to generate an image with the use of a signal output by the image pickup device, wherein
the image pickup device includes:
a plurality of pixel cells, each of the plurality of pixel cells including a plurality of photoelectric conversion units, a first selection transistor, a second selection transistor, and an amplification transistor;
a first signal line and a second signal line different from the first signal line; and
a vertical scanning unit,
the first selection transistor of a first pixel cell of the plurality of pixel cells being connected between the amplification transistor of the first pixel cell and the first signal line,
the first selection transistor of a second pixel cell of the plurality of pixel cells being connected between the amplification transistor of the second pixel cell and the first signal line,
the second selection transistor of the first pixel cell being connected between the amplification transistor of the first pixel cell and the second signal line, and
the second selection transistor of the second pixel cell being connected between the amplification transistor of the second pixel cell and the second signal line,
the vertical scanning unit supplies a signal to the first selection transistors such that period in which the first selection transistor of the first pixel cell is in an on state overlaps a period in which the first selection transistor of the second pixel cell is in an on state.

14. An image pickup system, comprising:
an image pickup device; and
a signal processing unit configured to generate an image with the use of a signal output by the image pickup device, wherein
the image pickup device includes:
a plurality of pixel cells provided in a plurality of rows and a plurality of columns, each of the plurality of pixel cells including a plurality of photoelectric conversion units, an amplification transistor connected to the plurality of photoelectric conversion units, a first selection transistor and a second selection transistor connected to the amplification transistor, and a plurality of microlenses;
a first signal line and a second signal line, the first signal line and the second signal line being provided corresponding to pixel cells in a single column; and
a vertical scanning unit,
the first selection transistor being connected to the first signal line,
the second selection transistor being connected to the second signal line, and
each of the plurality of pixel cells including a first color filter that allows light of first color to be incident on a part of the plurality of photoelectric conversion units and a second color filter that allows light of second color to be incident on another part of the plurality of photoelectric conversion units, wherein
the part of the photoelectric conversion units of the part of the pixel cells is a plurality of photoelectric conversion units on which light transmitted through a single microlens is incident, and
the part of the photoelectric conversion units of the another part of the pixel cells is a plurality of photoelectric conversion units on which light transmitted through another single microlens is incident, wherein, and wherein
the vertical scanning unit supplies a signal to the first selection transistor and a signal to the second selection transistor such that at least a part of a period in which the first selection transistor of a part of the plurality of pixel cells outputs a signal based on an electric charge of the part of the photoelectric conversion units to the first signal line while the first selection transistor of the part of the part of the pixel cells is in an on state and at least a part of a period in which the second selection transistor of the another part of the pixel cells to output a signal based on an electric charge of the another part of the photoelectric conversion units to the second signal line while the second selection transistor of the another part of pixel cells is in an on state.

15. An image pick up device according to claim 11, wherein the vertical scanning unit further supplies a signal to the second selection transistors such that a period in which the second selection transistor of one of the plurality of pixel cells is in an on state overlaps a period in which the second transistor of another one of the plurality of pixel cells is in an on state.

16. The method according to claim 1, wherein
the plurality of pixel cells are provided in a plurality of rows and a plurality of columns, and
the first signal line and the second signal line are provided to pixel cells in a single column.

17. The image pickup device according to claim 11, wherein
the plurality of pixel cells are provided in a plurality of rows and a plurality of columns, and
the first signal line and the second signal line are provided to pixel cells in a single column.

\* \* \* \* \*